US006862589B2

(12) United States Patent
Grant

(10) Patent No.: US 6,862,589 B2
(45) Date of Patent: Mar. 1, 2005

(54) SYSTEM AND METHOD FOR PERFORMING DIAGNOSTICS USING A PORTABLE DEVICE DISPLAYING DIAGNOSTIC DATA USING TEMPLATES

(75) Inventor: Charles Grant, Dublin, OH (US)

(73) Assignee: Ranco Incorporated, Wilmington, DE (US)

(*) Notice: Subject to any disclaimer, the term of this patent is extended or adjusted under 35 U.S.C. 154(b) by 454 days.

(21) Appl. No.: 10/141,775

(22) Filed: May 10, 2002

(65) Prior Publication Data

US 2003/0009710 A1 Jan. 9, 2003

Related U.S. Application Data

(60) Provisional application No. 60/289,825, filed on May 10, 2001.

(51) Int. Cl.$^7$ .............................................. G06F 17/30
(52) U.S. Cl. .............................. 707/3; 707/10; 702/183
(58) Field of Search ....................... 707/3, 10; 702/183

(56) References Cited

U.S. PATENT DOCUMENTS

| | | | | | |
|---|---|---|---|---|---|
| 5,806,071 | A | * | 9/1998 | Balderrama et al. ..... | 707/104.1 |
| 6,317,718 | B1 | | 11/2001 | Fano | |
| 6,484,150 | B1 | | 11/2002 | Blinn et al. | |
| 6,529,908 | B1 | * | 3/2003 | Piett et al. ..................... | 707/10 |
| 6,546,002 | B1 | | 4/2003 | Kim | |
| 6,671,655 | B2 | * | 12/2003 | Moccio ....................... | 702/183 |
| 6,701,352 | B1 | * | 3/2004 | Gardner et al. ............. | 709/218 |

FOREIGN PATENT DOCUMENTS

| EP | 0 562 901 | 9/1993 |
|---|---|---|
| EP | 0562901 A | 9/1993 |

OTHER PUBLICATIONS

Sengupta, Arijit et al., "Query By Templates: A Generalized Approach for Visual Query Formulation for Text Dominated Databases", Digital Libraries, 1997, ADL '97. Proceedings., IEEE Internatinational Forum on Research and Technology Advances in Washington, DC, USA May 7–9, 1997, Los Alamitos, CA, USA, IEEE Comput. Soc, US, May 7, 1997, pp. 36–47.

European Search Report dated Aug. 1, 2002.

* cited by examiner

*Primary Examiner*—Jack M. Choules
(74) *Attorney, Agent, or Firm*—McDermott Will & Emery LLP

(57) ABSTRACT

A diagnostic tool suite is made available to technicians servicing equipment at residential and business locations using a portable device such as a PDA. The PDA runs a main engine that can execute diagnostic modules, with each diagnostic module corresponding to a particular appliance or device that requires troubleshooting, repair, diagnosis, maintenance or installation. The diagnostic modules use a limited number of templates to define possible screen layouts for each screen displayed to the technician. Additionally, the diagnostic module includes a diagnostic flow definition file wherein each record corresponds to a screen displayed to a technician. The main engine uses the template information and the diagnostic flow definition records to fully define a screen to display to a technician. In this way, an extensible, modular, non-specific diagnostic tool suite is available to a technician. To simplify creation of the diagnostic definition files, a graphical user development tool is provided that allows a non-skilled user to select a template definition, to be prompted for definitions of the fields in that template and to create the diagnostic definition file incorporating the user's input.

33 Claims, 28 Drawing Sheets

```
Step 2                                                    [X]
─────────────────────────────────────────────────────────────

Please enter the text that is to appear under the CORRECTION
    heading:
    ┌─────────────────────────────────────────────────┐
    │ |                                               │
    │                                                 │
    │                      908                        │
906─│                                                 │
    │                                                 │
    │                                                 │
    └─────────────────────────────────────────────────┘

[ < Back ] [ Next > ]  [ Cancel ]
```

FIG. 9C

```
Step 3                                                    [X]
─────────────────────────────────────────────────────────────

Do you wish to add a YES NO question to this CAUSE
    CORRECTION from?

910─    ┌──────────────┐        ┌──────────────┐
        │   Yes I do   │        │  No I don't  │
        └──────────────┘        └──────────────┘

[ < Back ] [ Next > ]  [ Cancel ]
```

FIG. 9D

| Step 1 | [X] |

Please enter text you wished displayed as the question

912 — 914

< Back | Next > | Cancel

FIG. 9E

| Step 3 Congratulations | [X] |

Congratulations...

You have successfully defined all the data necessary to create a new CAUSE CORRECTION Screen. Press Finish to complete the operation.

916 —

< Back | Finish | Cancel

FIG. 9F

SYSTEM AND METHOD FOR PERFORMING DIAGNOSTICS USING A PORTABLE DEVICE DISPLAYING DIAGNOSTIC DATA USING TEMPLATES

RELATED APPLICATIONS

This application relates to and claims priority from U.S. Application Ser. No. 60/289,825 filed May 10, 2001 entitled Personal Digital Assistant Diagnostic Tool, the disclosure of which is hereby incorporated in its entirety by reference.

FIELD OF THE INVENTION

The present invention relates to equipment diagnostic systems and, more particularly, to automated diagnostic systems for heating and cooling equipment.

BACKGROUND OF THE INVENTION

The number and complexity of appliances and equipment being provisioned at residential and business locations is growing at an unprecedented rate. Furthermore, this equipment typically includes microprocessors and other programmable logic that allow interoperation and communication with other appliances as well as remote devices. Servicing and maintaining such equipment has always been a difficult task that will only become more challenging and complex in the future.

In the past, a specialized and very skilled and experienced technician was needed that understood the troubleshooting procedures and operation of a variety of appliances as well as the usefulness of different troubleshooting equipment such a volt meters, amp meters, pressure gauges and similar test equipment. This approach to maintenance and repair relies almost exclusively on the skill of the technician and is becoming more difficult as appliances are equipped with more intelligence.

Individual, specialized diagnostic devices for each piece of equipment or appliance is one possible maintenance solution. However, the costs of so many, and so specialized, diagnostic devices make such a solution too expensive and unattractive for most service personnel and companies. The variety of manufacturers and different appliances available would preclude most service personnel from being trained for and repairing or maintaining more than just a few lines of equipment.

A more general diagnostic device that can execute respective customized software for a variety of equipment or appliances would avoid some of the above-identified problems. However, there would still be a tremendous cost in developing and coding the numerous customized software applications for each appliance. Training for service personnel on each customized software application, ensuring software compatibility, and providing revisions that are forward and backward compatible are all additional problems that would need to be addressed and overcome to make such a diagnostic platform tenable.

Accordingly, there is a need for a diagnostic system that can be used by service personnel to diagnose, repair and maintain equipment and appliances that can be used with a variety of models and manufacturers of equipment, that is familiar to diagnostic manual used by many technicians, and that uses software that can be easily and quickly developed.

SUMMARY OF THE INVENTION

The present invention addresses these and other needs by providing an application environment within a portable, or remote, device that utilizes diagnostic modules that are easily created using a diagnostic database development tool.

One aspect of the present invention relates to a data-driven diagnostic apparatus for a plurality of devices. This apparatus includes a plurality of template records, each template record corresponding to a respective one of a plurality of predetermined templates, and a plurality of data records related to diagnostic information about one of the devices. Each of the data records reference on eof the templates. Also included is a query engine configured to display one of the data records, formatted according to its referenced template, on a display device.

Another aspect of the present invention relates to a method of providing a data-driven diagnostics tool for a plurality of appliances. This method includes the steps of reading one template record from a template file comprised of a plurality of template records and reading one record from a data record file, wherein the record references the one template record and the data record file is associated with one of the plurality of appliances. The method includes executing a form-generation routine to dynamically format the one record in accordance with the one template record, and then displaying the formatted one record.

An additional aspect of the present invention relates to a diagnostic database development system that is comprised of a plurality of template records, each template record corresponding to a respective one of a plurality of predetermined templates and identifying one or more entities and their respective locations on a display screen; respective device description files, each such file corresponding to an appliance from among one or more appliance; a graphical user interface tool for each of the template records, each said tool comprising a sequence of screens to gather information for customizing those entities that are configurable in order to create a record; and a database builder configured to combine any record created by each of the graphical user interface tools into a database file.

A further aspect of the present invention relates to a method for developing a diagnostic flow definition database. The method according to this aspect starts with the step of selecting an appliance that corresponds to the diagnostic flow definition database, the database comprising a plurality of nodes. The method continues by creating a respective record for each node by (a) selecting a respective template, and (b) customizing variables and data that are configurable for the respective template. Finally, the method concludes by combining the records to form the diagnostic flow definition database.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

While the present description focuses on an exemplary embodiment of a portable device, such as a PDA, being utilized by a service technician, the present invention also contemplates the use of a remotely-connected computing platform performing similar operations and having similar functionality. Furthermore, the described diagnostic tool and methods can be used connected to an "intelligent" appliance or, alternatively, can operate independently from such an appliance. In the first instance, the diagnostic tool and the appliance can communicate and exchange parameters and values helpful in the diagnoses and repair of the appliance. Possible communications protocols include, for example, RS 232, RS 485, USB, Blue Tooth, TCP/IP, IRda, and Wireless GPS. In the independent operational mode, the diagnostic routines and procedures may be the same but the values and parameters can be manually entered by the on-site technician.

Exemplary Environment

Figure 1:
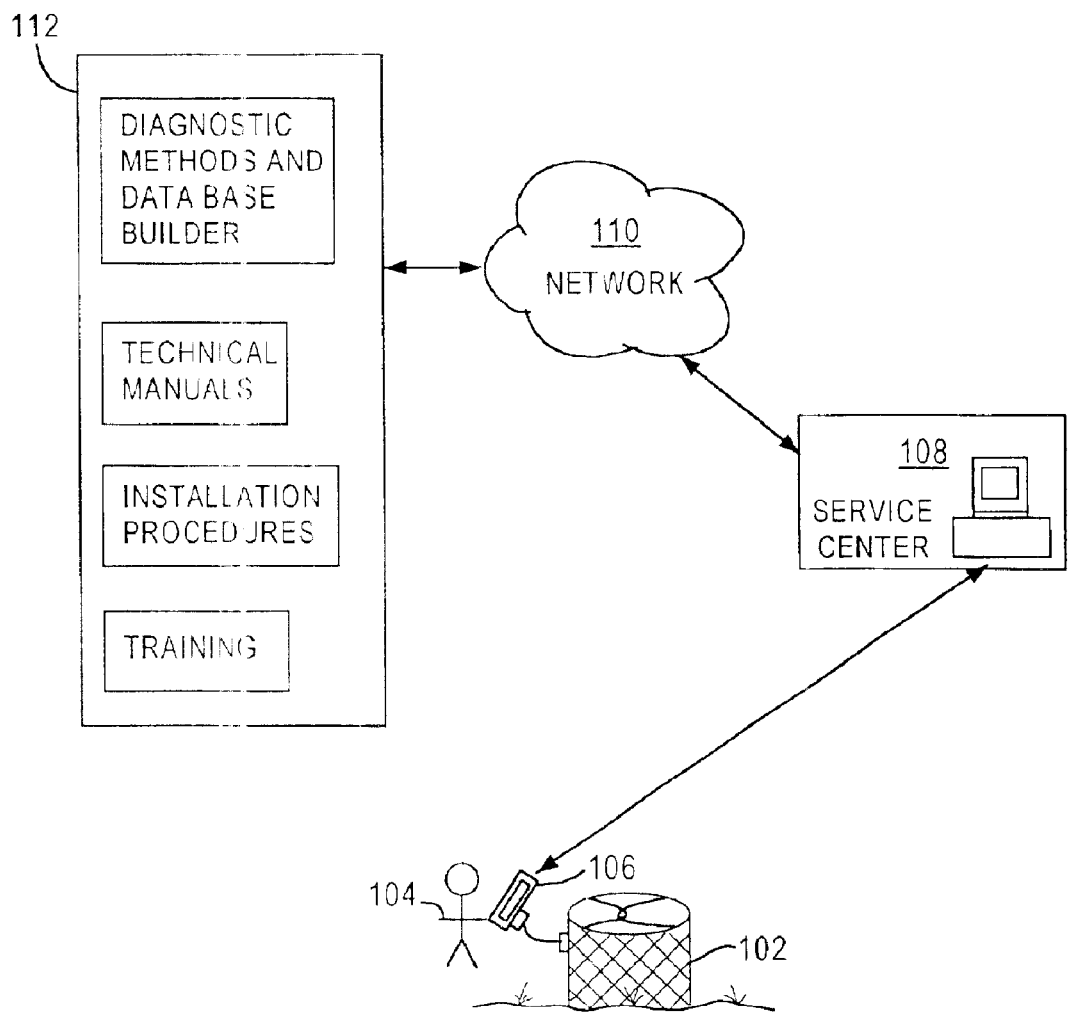
FIG. 1 illustrates an exemplary environment in which an embodiment of the present invention is beneficial.

FIG. 1 depicts an exemplary environment in which the present invention may prove useful. An appliance 102 requires some type of repair or maintenance by a service technician 104. The service technician uses the present diagnostic tool suite and methods via a PDA 106 or other portable device. The PDA 106 runs software that aids in diagnosing and troubleshooting the equipment 102. A service center 108 is depicted as a central repository of information that is useful for the PDA 106 in performing its functions. In one embodiment, the service center 108 is owned by the service company employing the technician 104 and the service center 108 has purchased, or otherwise acquired or developed, the information to download to the PDA 106. In another embodiment, the service center 108 can be a third party provider 112 of the useful information. The service center 108 can be located remotely from the source of useful information 112 but communicate or receive the information from the provider 112 over a network 110. In addition to diagnostic methods and information, the data provider 112 can provide technical manuals and schematics as well as equipment installation help or training courses. In a preferred embodiment, the service technician 104 pays for just the diagnostic module needed to diagnose the appliance 102 and downloads that module from the service provider 108 to the PDA 106. The technician 104 then uses that module to perform service on the equipment 102.

Service personnel have the possibility of servicing a wide variety of appliances with each serviceman having different needs. Additionally, the service equipment used by the servicemen must cover more than just a single product and, therefore, needs to be readily adaptable to the variety of day-to-day activities the serviceman may encounter. Accordingly, a modular approach has been taken that allows for a PDA, or other portable device, to have a resident "engine" that executes add-on diagnostic modules that are created using a database development tool. This design permits a large number of modules to be developed by one or more parties to cover the market and allows service personnel or companies to separately acquire and pay for modules only as needed. Appliances can include, for example, furnaces, hot water heaters, air conditioning systems, packaged terminal air conditioners (PTACs), heat pumps, etc.

General Components

Thus, from an overall standpoint, the software suite at the PDA consists of two elements — a query engine and the diagnostic modules. The query engine is a hard coded executable written for the Palm OS, for example, or anther operating systems for other PDA-type devices. The query engine reads diagnostic information and instructions from a diagnostic database file and executes them. The diagnostic database file is in a predefined template format of which the query engine has prior knowledge. From the PDA's perspective, the query engine is, for example, a Palm executable file (i.e., .prc) that contains predefined template information. This query engine is a one-time, hard coded engine that executes as driven by a selected diagnostic module. In this instance, "one-time" merely means that a new query engine is not needed for each different manufacturer or product. The query engine can, of course, be revised and updated to provide additional functionality as needed.

Each diagnostic module is comprised of multiple databases that include text, variables, communication information, and flow of the different diagnostic screens related to a particular appliance. Once selected, a particular diagnostic module is loaded having associated scripts, templates, data and other information. The query engine then executes as driven by the diagnostic module. When connected to an intelligent appliance, for example, the PDA can communicate with the appliance and query the appliance for data that is displayed to the service personnel or used for automatic diagnostic purposes. To maximize use and provide flexibility, given the variation in communication protocols and applications, the diagnostic module includes a portion that defines communication strings, variable and variable attributes that are associated with that particular, product-specific, diagnostic module.

The data-driven diagnostic tool suite envisioned within the present invention, utilizing a PDA-based diagnostic engine, can be leveraged across a wide range of manufacturer specific hardware devices. The query engine will present to the technician any one of a number of diagnostic steps required to be taken in order to isolate, identify and repair a unit malfunction. It will present appropriate diagnostic flows, recommendations, part numbers and technical reference information for whatever hardware unit is being diagnosed by the technician. The query engine's execution is "data-driven" in that its operation is defined by whatever Diagnostic Flow Definition (DFD) database is loaded at the time of diagnosis. This DFD database will determine what is actually seen on the PDA screen by the technician.

Figure 2:
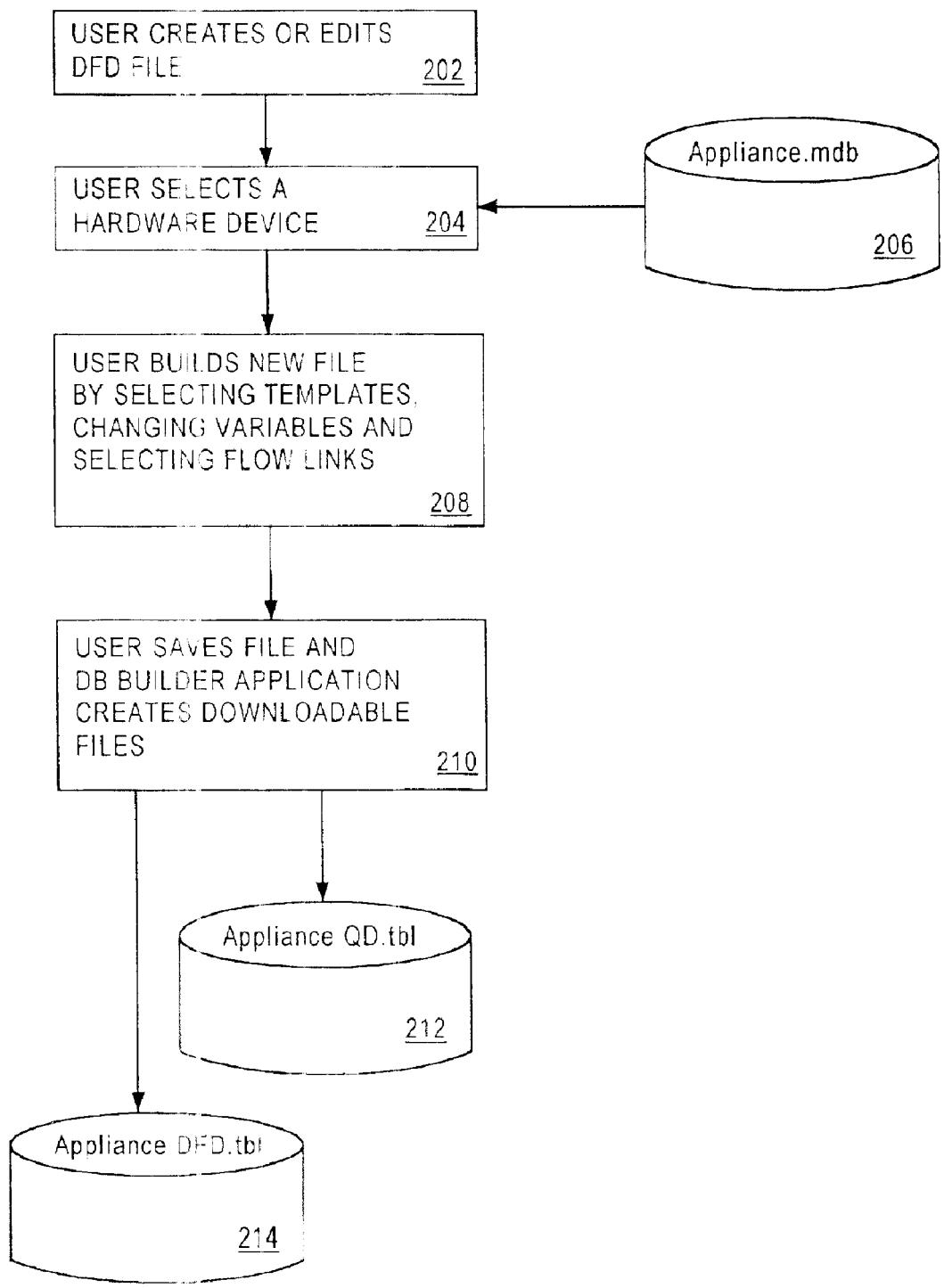
FIG. 2 illustrates a high-level function diagram of exemplary software for building diagnostic databases according to an embodiment of the present invention.

There will be many different diagnostic modules needed to cover all the product versions and manufacturers of appliances and equipment. The potential burden, expertise, time and cost of creating these diagnostic modules could potentially be overwhelming. However, a "database builder" application, hereinafter referred to as DB Builder, uses the known templates to permit the creation of the database files within each diagnostic module with little if any software expertise or experience. FIG. 2 provides a flowchart of the operation of the DB Builder application that begins at step 202 with the user electing to create a new DFD file or edit an existing DFD file. When using the DB Builder application, the user first selects in step 204 a hardware definition file 206 that includes information about a specific product. The user then selects, in step 208, from among the available templates in order to start building the diagnostic module. Each template defines a PDA screen having pre-defined entities within it and the user then selects/defines all variables and information on the displayed template. The user continues defining the diagnostic flow by identifying what screen is displayed next when a "next", "yes", "help", "no", etc. button is selected. Once complete, the diagnostic module is ready for storage 212 and 214 and use.

Elements that appear on the PDA screen and whose characteristics a user can define are known as "entities". In a preferred embodiment, the DB Builder supports three types of entities: text entities, button entities, and field entities. Each entity is defined by a User interface Template database which resides in the PDA and on the DB Builder workstation. A valid DFD consists of a fixed DFD preamble followed by any combination of entities. The DFD, in conjunction with the rules of operation defined by the UIT, are used by the query engine to interpret the user provided input and correctly generate the desired graphical user interface on the PDA.

Portable devices such as PDAs include a basic "hot-sync" function that allows them to communicate with typical desktop computers and other computing platforms. Such a function can be customized within the present environment to install the query engine on the PDA, synchronize all the diagnostic modules available on the PDA, and create a directory of all the diagnostic modules available on the PDA. In certain diagnostic modes, the PDA may also acquire and store data from an appliance or equipment. This data can be uploaded from the PDA to a computer as needed using the customized hot-synch functionality as well.

Designing the diagnostic tool to be data-driven means there are databases being leveraged to accomplish various and plural tasks. Accordingly, the term "database" becomes too generic and confusing to unambiguously refer to different parts of the present invention. Below are some specific databases that are included in, or used by, a diagnostic module.

A Query Device (QD) database is used to provide hardware specific information within a diagnostic module about a specific appliance that is to be serviced. The QD database includes at least three distinct types of information:

1) an array of descriptive strings that constitute the terms that can be queried from a target hardware device, such as Serial No., Model No., etc.; (these names can be presented to an operator when creating a DFD file for a target device)

2) the actual query strings (i.e., machine codes understood by a controller within an intelligent appliance) that are sent over a communications medium to the hardware device; and 3) parameter constraints (e.g., minimum and maximum values), if any, for valid query items.

A Diagnostics Flow Definition (DFD) database contains the data that defines the screens that the PDA presents to the technician. The entire flow, the look of the screens and the actions that are performed when certain choices are made by the technician are fully defined by this database.

A Master DFD database resides on the PDA and contains a list of all the DFD databases that are located on the PDA. This master database is used when the query engine is first launched. If it contains more than one entry, a list is presented on the PDA screen to the technician upon starting the query engine. The technician can then choose, from the list, the particular DFD wanted to perform a diagnostics task.

In a preferred embodiment, the native format of a DFD file is Microsoft Access. However, Microsoft Access may not be natively supported on the Palm OS or other PDA operating systems. Accordingly, a translation form Access to a flat database file format can be employed. A flat file is one in which table data is gathered in lines of ASCII text with values from each table delimited in some manner. The use of the flat file requires the query engine to have some knowledge of how the data is organized within the file. The DB Builder workstation or other computer will therefore provide a communications application which, in downloading the DFD database, will also translate that database into one or more flat files useful to the PDA operating system and query engine.

DB Builder

In order to provide flexible and simple development of the present diagnostic tool suite and system, the concept of templates is employed in the design of the DB Builder application. In a preferred embodiment, five different templates are employed that can handle almost any diagnostic screen that needs to be presented to a technician during a typical diagnosis scenario. More or fewer templates could be utilized without significantly departing from the scope and coverage of the present invention. The ability to add templates to handle new or uncommon scenarios is inherent in the modular design used in the present tool suite system.

Templates

Each graphical user interface (GUI) template defines the number of user interface entities or components, their general appearance, and the functional specifics for any given screen. The query engine, through the use of the DFD and QD databases, has predetermined knowledge regarding these templates. Such knowledge can include:

1) the particular type of template being employed for a given display screen;

2) the particular layout of each template;

3) the number of user interface components for each template; and 4) the command to execute for a given action the user takes, whether it be to proceed to a next screen or acquire data (from either the technician or the appliance itself).

The five templates within the preferred embodiment include a menu template, a yes/no template, an instruction template, a user input template, and a cause/correction template.

Menu Template

Figure 3A:
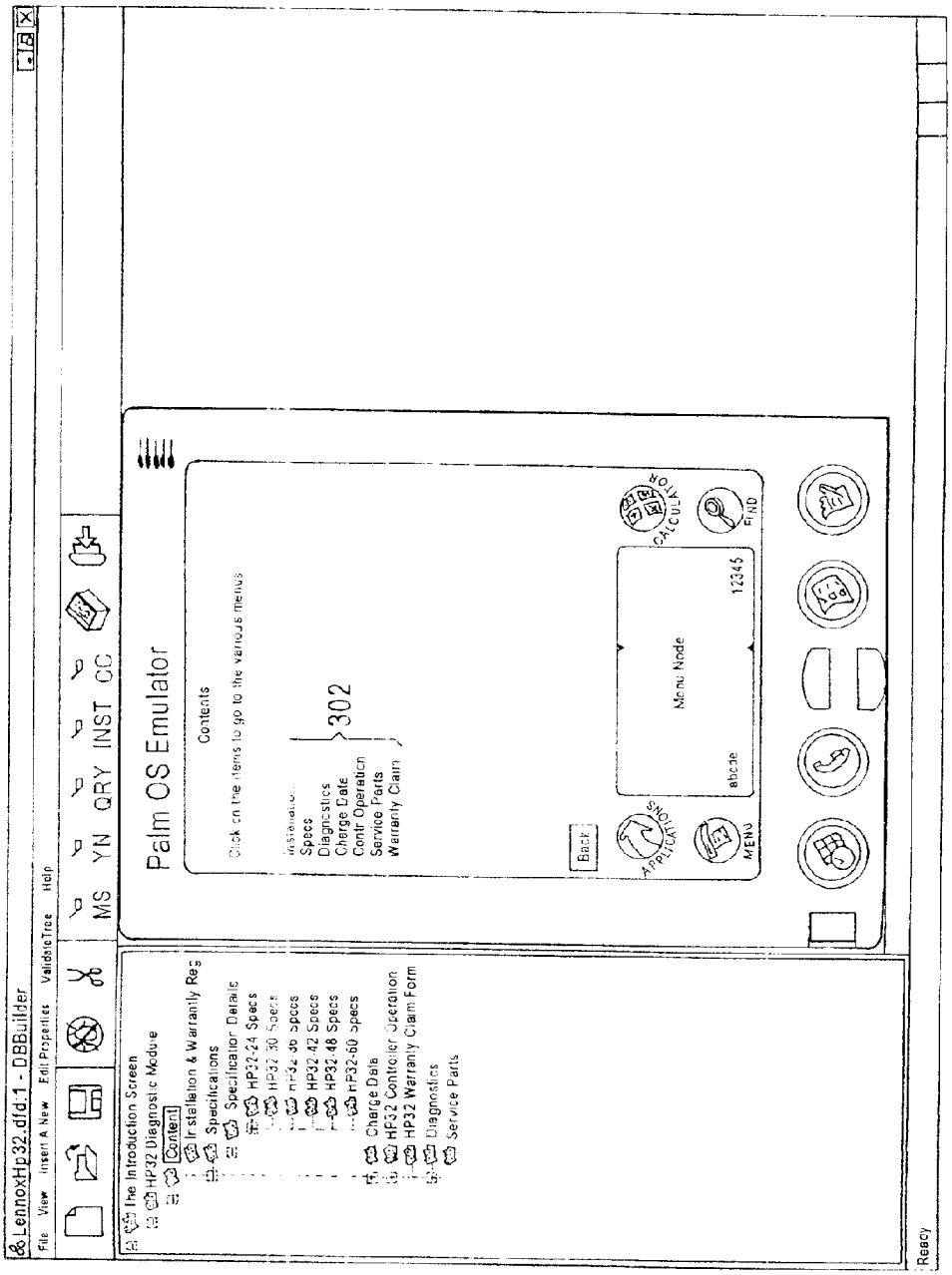
FIGS. 3A–3E illustrate exemplary template screens in accordance with an embodiment the present invention.

The menu template depicted in FIG. 3A is the most basic of all templates and is usually used for the first screen of a DFD file. The menu template provides the ability to define sub-choices from any given location from along a diagnostics thread.

A diagnostics thread can be thought of as a tree structure having a root node and many branches with leaf nodes. A node or node record is the incarnation of a template in database format, each such node along the diagnostics thread is realized in graphical format as a template. Thus, the menu template provides the ability to select the root node or any other node within a diagnostics thread.

The creating of a menu template allows the configuration of the number of choices 302 that can be made, the label assigned to each of these choices, and defining a link for each possible choice that the menu template offers.

Yes/No Question Template

Figure 3B:
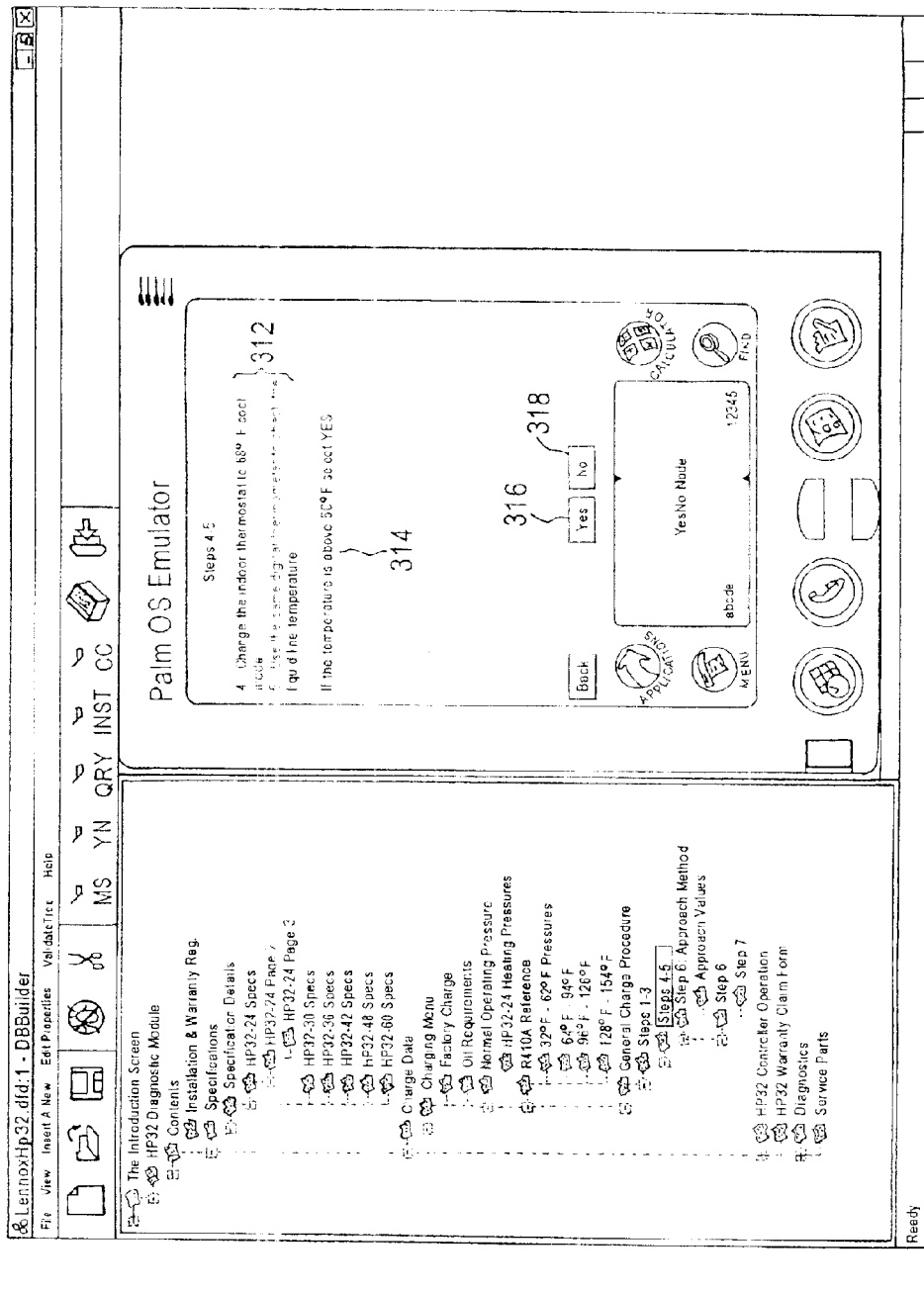

The creating of a Yes/No template, depicted in FIG. 3B, allows for the input of text 312, such as instructions or directions, and the formation of a question 314 that can be answered by a "yes" or "no". The template also displays two navigation buttons 316 and 318 labeled "Yes" and "No", each having a respective sub-node associated with a path taken if the respective button is selected.

Instruction Template

Figure 3C:
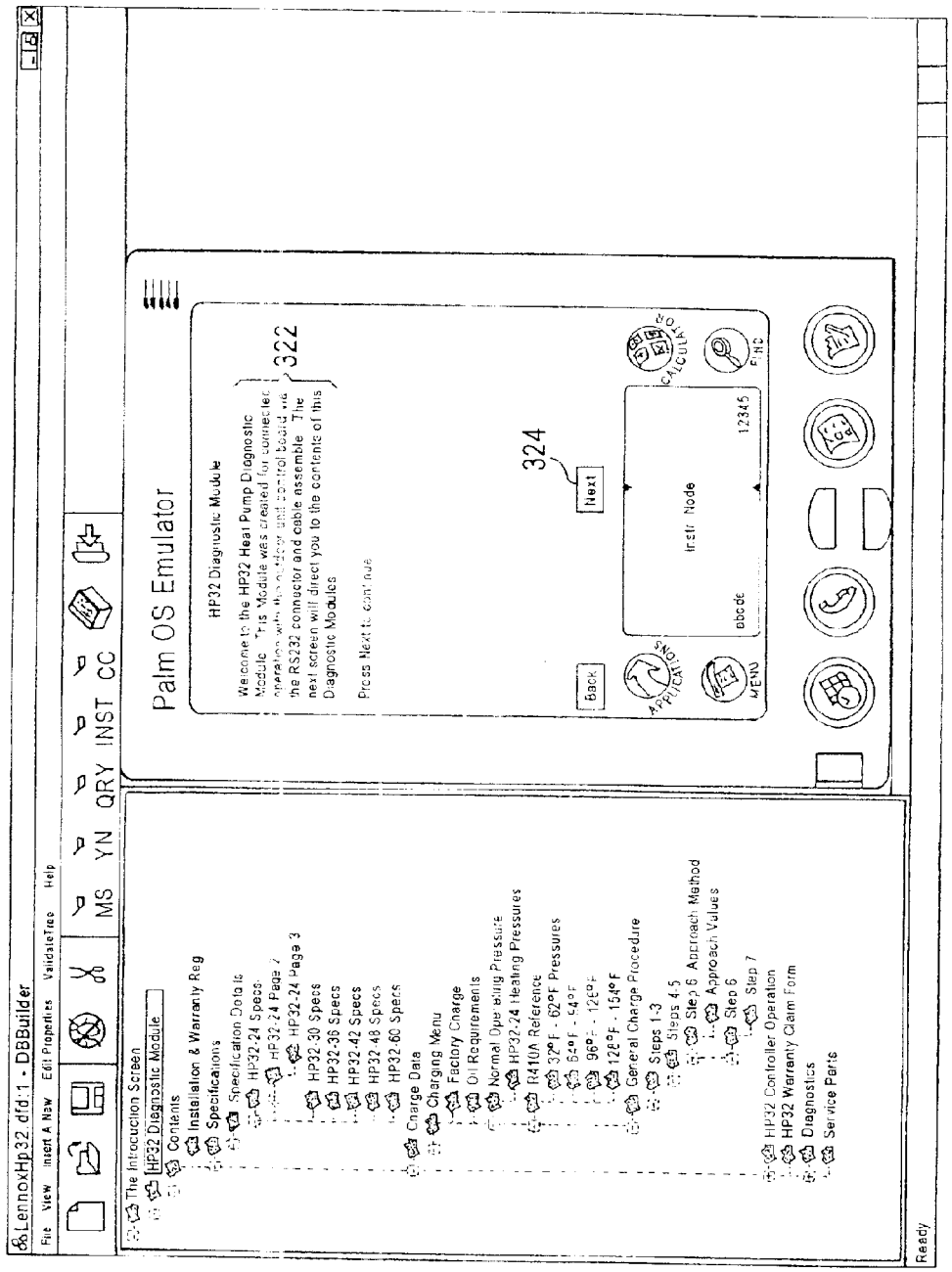

The creation of an instruction template, depicted in FIG. 3C, allows for the inputting of text 322 that poses a directive to be displayed to the user and allows for the selection of only a single additional button 324. This button is preferably labeled "OK", "Next" or some synonymous label. For example, this template can be used to instruct the technician to plug in an auxiliary piece of equipment before continuing. The diagnostics flow will stop until such time as the technician responds by affirmatively depressing the "OK" button (or until the technician selects the "Back" or "Main" buttons).

User Input Template

Figure 3D:
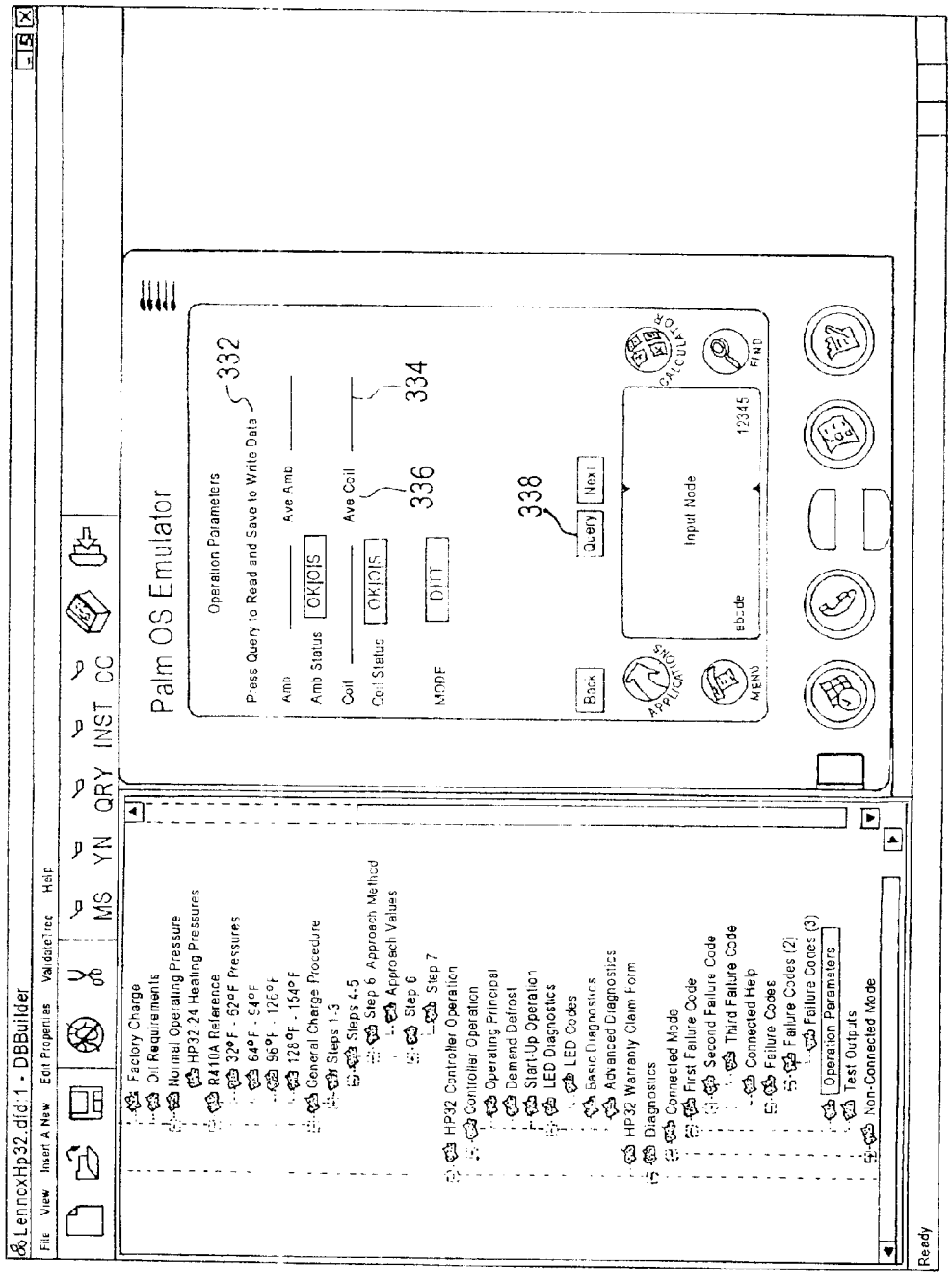

The creation of a user input template, depicted in FIG. 3D, allows for the input of text 332 and a configuration of the number of input fields 334, labels 336 associated with each field, and the ability to query information from the hardware. A single button 338 selection is allowed which is labeled "query" or something similar.

Cause/Correction Template

Figure 3E:
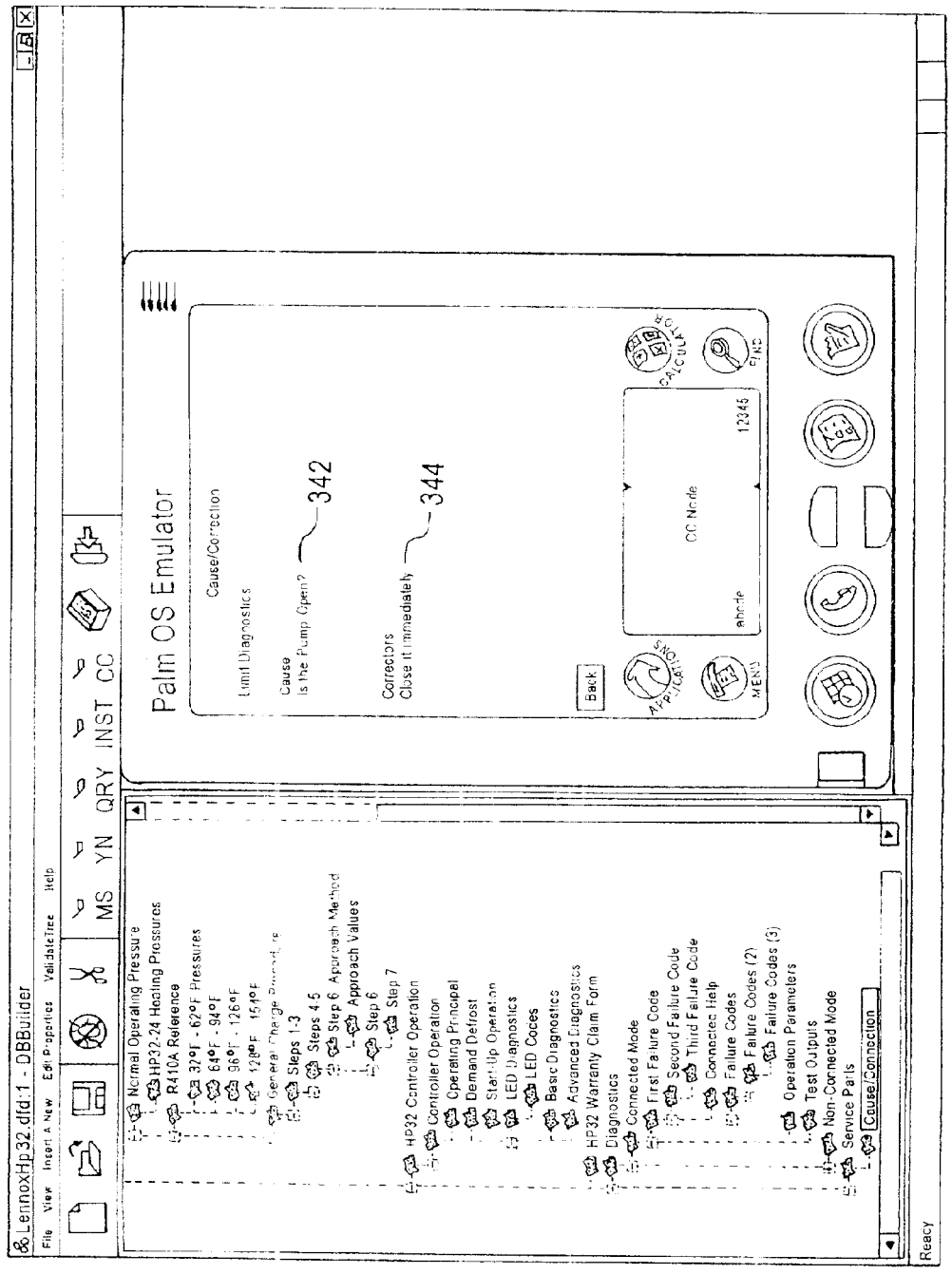

The creation of the cause/correction template, depicted in FIG. 3E, allows for the input of two distinctive sections of text, one section 342 will be displayed under the heading "Cause" and the other section 344 will be displayed under the heading "Correction".

Development Wizard

The DB Builder is a software tool resident on a workstation that provides a graphical user interface that allows a user with little, or no, programming experience to define a diagnostics flow. Such a definition includes the screens that a technician will see when running the diagnostics flow as well as where to "jump" and "back-track" within the diagnostics flow. Ancillary functions of the DB Builder include the ability to save a diagnostics flow as a DFD file and the ability to download the DFD file to a PDA for execution by the query engine. The user interface is based on a hierarchy structure analogous to a tree. Each node of the tree represents a screen to be displayed to the user. The flow from the root of the tree to a node that has no sub-nodes (i.e., an end node) is defined to be a thread. The tree can be comprised of as many threads as necessary to handle the permutations encountered in any given diagnosis scenario. The path of any given thread completely defines a diagnostics flow path.

The DB Builder opens with a screen that allows the user to create a new DFD file or to open an existing file. Creating a new file implies that a DFD file (or database) will be generated for a particular hardware appliance. The identification of the target must be made known to the DB Builder. Using this knowledge, the DB Builder is able to link to an appropriate QD database to retrieve information, such, as what items for this particular device can be queried, what command strings comprise a valid query for this device, and what are the valid ranges of data resulting form the queries. The different QD databases can be created by an equipment manufacturer, the controller manufacturer, or even a third party.

The DB Builder allows for the configuration of each node (i.e., displayed screen) using a predefined set of user interface templates; limits the number of templates to reduce the possibility of information overload, confusion, and user error; provides for the configuration of only predefined fields within the allowed templates; provides enough templates to handle the majority of diagnostic flow needs; allows for extensibility by permitting the addition of templates if necessary in the future; and provides help "wizards" to assist a user in customizing the screen templates.

In some instances, a hardware-independent choice may be valid to create a tutorial or training program that is not tied to a specific appliance. Under this mode, the DB Builder can prevent selection of certain templates such as the "Data Input" template.

Figure 4:
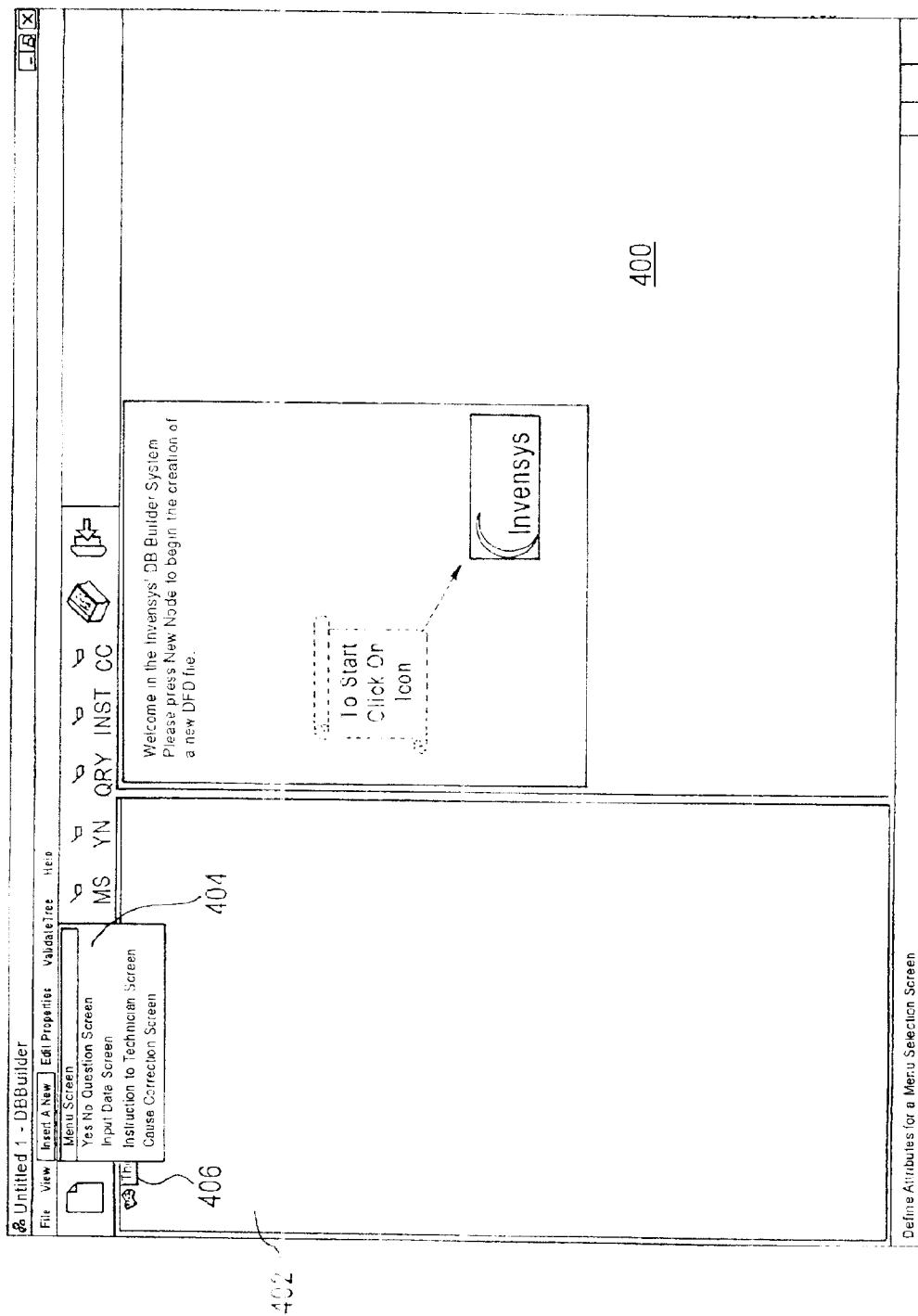
FIG. 4 illustrates an exemplary screen shot of a welcome screen of a database builder application in accordance with the embodiment of FIG. 3.

FIG. 4 illustrates an initial screen 400 for creating a new DFD file using the DB Builder application. The window 402 in the left part of the screen indicates the tree-like structure of the diagnostics flow being defined; however, this window currently contains only the root node 406—"The Introduction Screen" which is obscured in this figure behind the drop-down menu 404. The user has selected either the toolbar menu item or a corresponding icon to "Insert a New Mode" and then selected the "Menu" template so as to highlight that option.

Exemplary Wizard Screen Shots

Figure 5A:
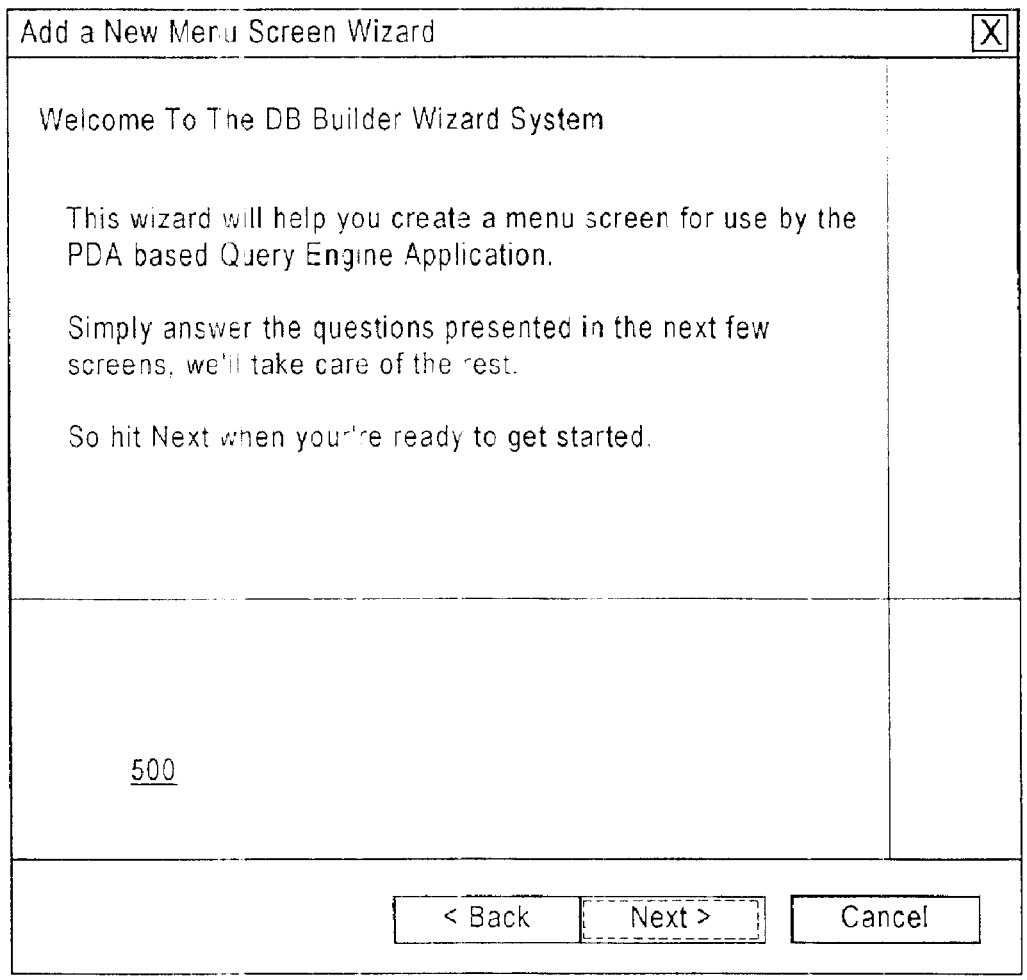
FIGS. 5A–10 illustrate a sequence of exemplary screen shots of a development wizard tool for creating diagnostic flow definition records according to an embodiment of the present invention.
Figure 5B:
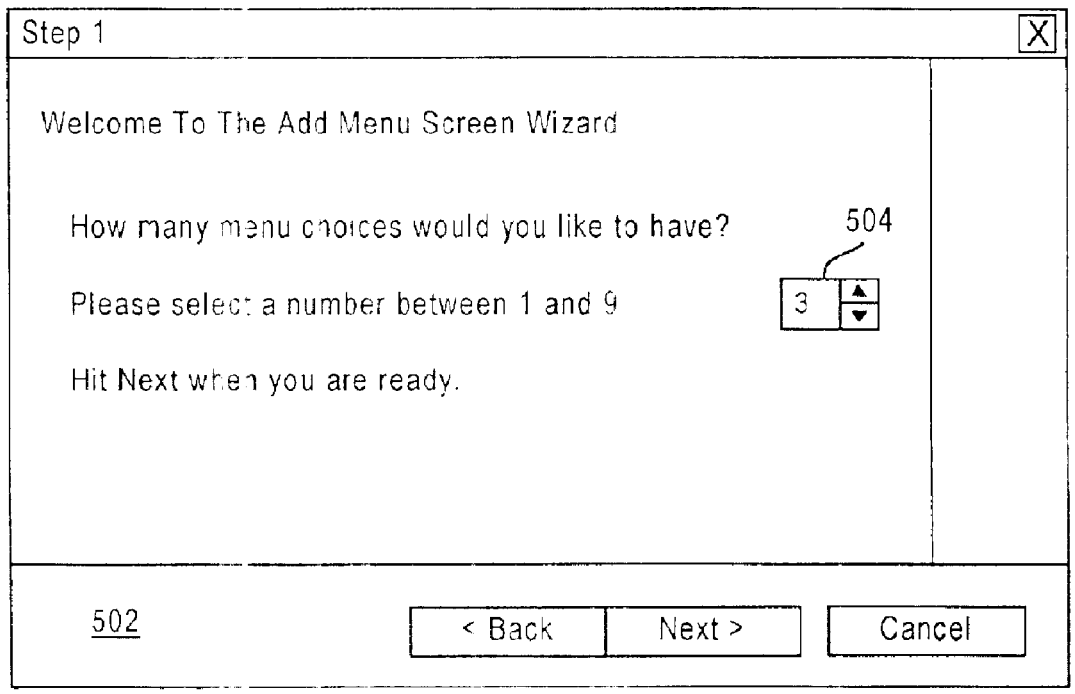
Figure 5B:
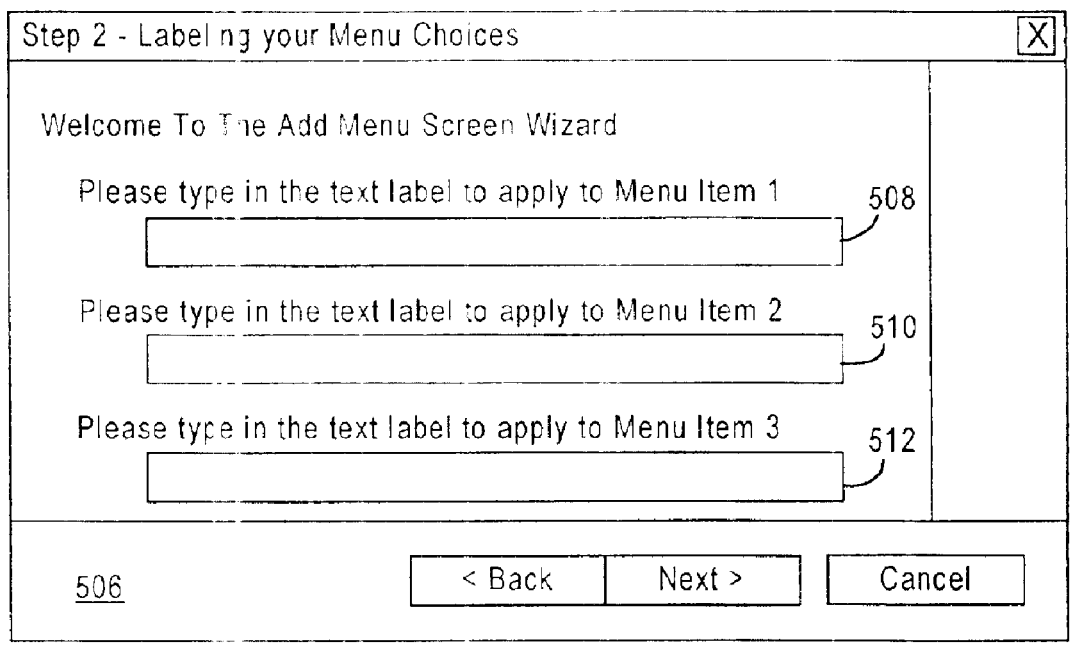
Figure 5D:
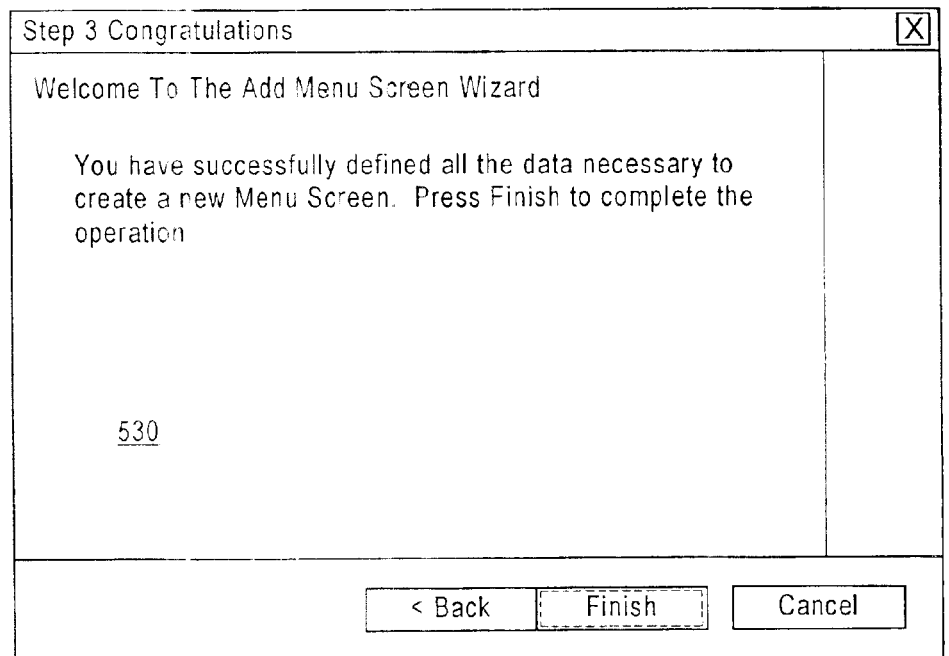
Figure 5C:
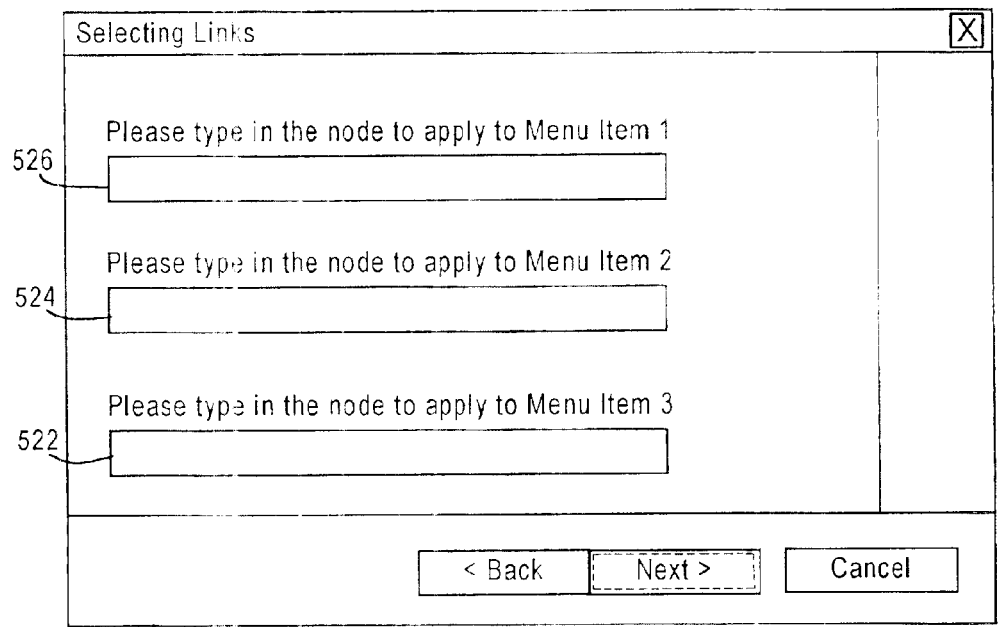

FIGS. 5A–5D show a sequence of screens that an exemplary development wizard tool would provide to help an unskilled user produce a PDA screen built on the Menu template. In FIG. 5A, the user receives a welcome screen 500 explaining the use of the menu screen. The top half of FIG. 5B provides the user a dialog window 502 in which the number of menu items 504 can be specified. By selecting "Next" the user can proceed to the bottom screen 506 of FIG. 5B. In this screen, a corresponding number of entry fields 508, 510, and 512 are provided to allow the user to define the text label that is assigned to each menu choice. By proceeding to FIG. 5C, the user is presented with a screen 520 that allows, using entry fields 522, 524 and 526, the specification of the respective child node (or link) associated with each of the menu choices. After completing the screen in FIG. 5C, the user is finished with defining the menu screen and can exit using screen 530 as shown in FIG. 5D. Upon exiting, the DB Builder constructs a DFD record with the information supplied by the user.

Figure 6A:
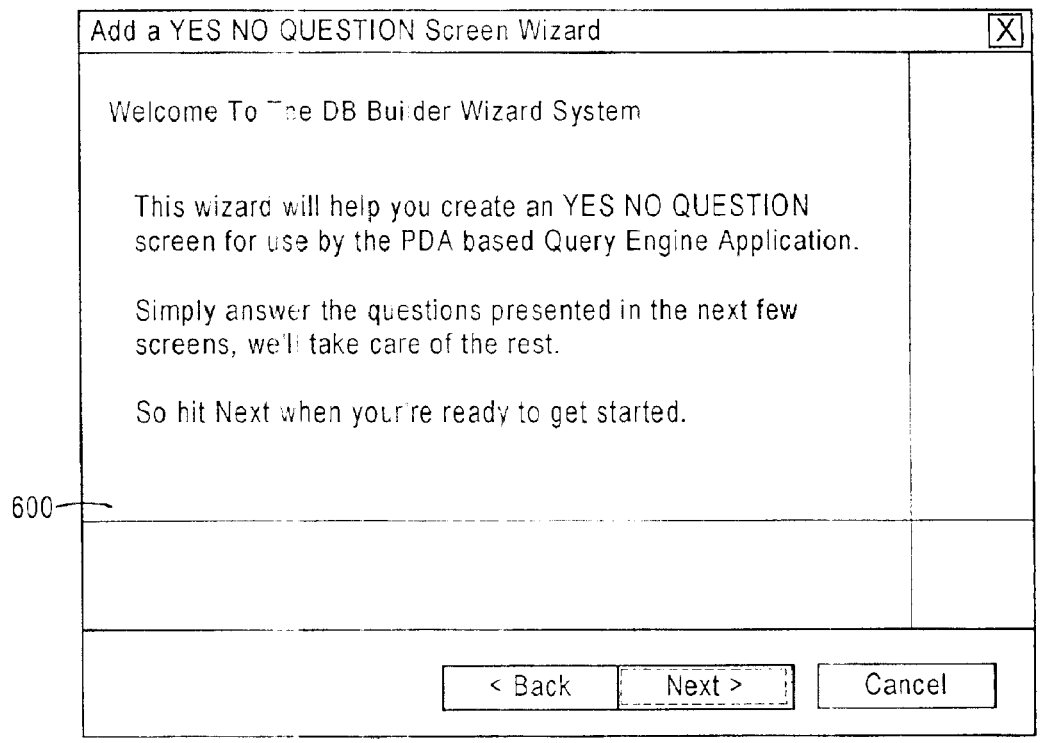
Figure 6B:
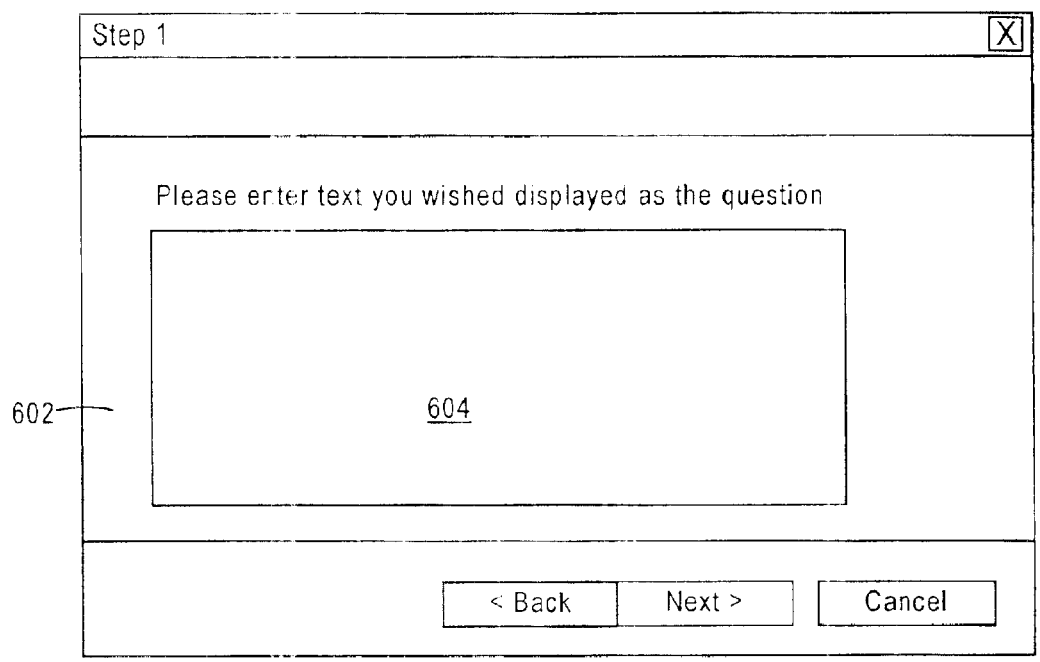
Figure 6D:
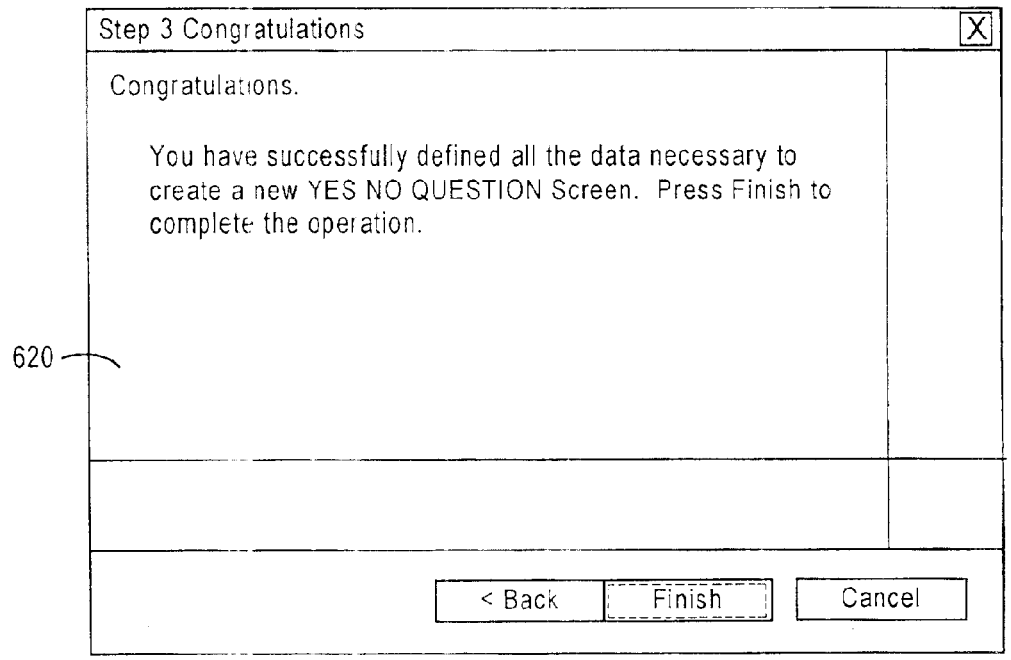
Figure 6C:
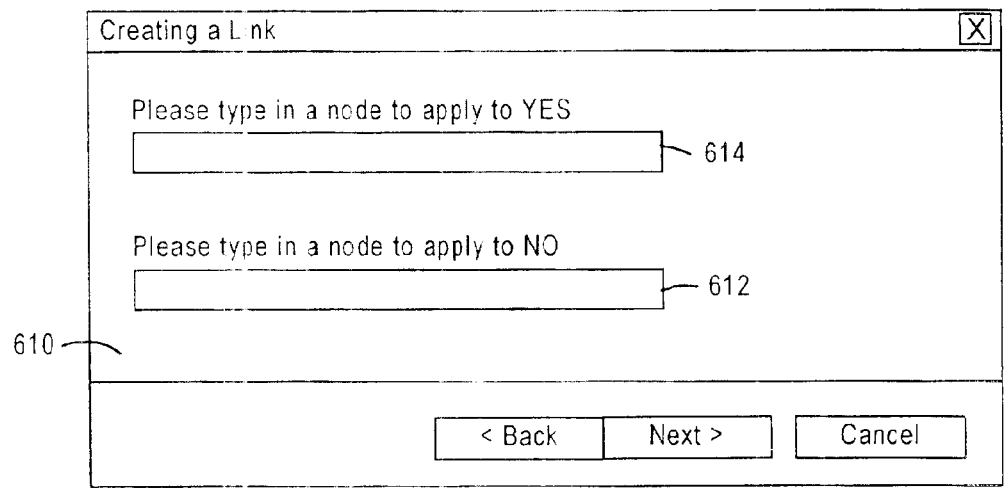

FIGS. 6A–6D show a sequence of screens that an exemplary development wizard tool would provide to help an unskilled user produce a PDA screen built from a Yes/No template. FIG. 6A depicts the first screen 600 that explains the purpose and use of a Yes/No form. By proceeding to FIG. 6B, the user is presented with screen 602 that includes a text entry screen for inputting the text that is to be posed as a question. As the Yes/No template automatically defines two buttons which result in a diagnostic flow path change upon their selection, the wizard provides the screen 610 to the user as shown in FIG. 6C. The screen 610 includes two data entry fields 612 and 614 where the user can specify the name of the node that is to be jumped to depending on whether the "Yes" or "No" button is selected by a technician. After completing the screen in FIG. 6C, the user is finished with defining the Yes/No screen and can exit using the screen 630 as shown in FIG. 6D. Upon exiting, the DB Builder constructs a DFD record with the information supplied by the user.

Figure 7A:
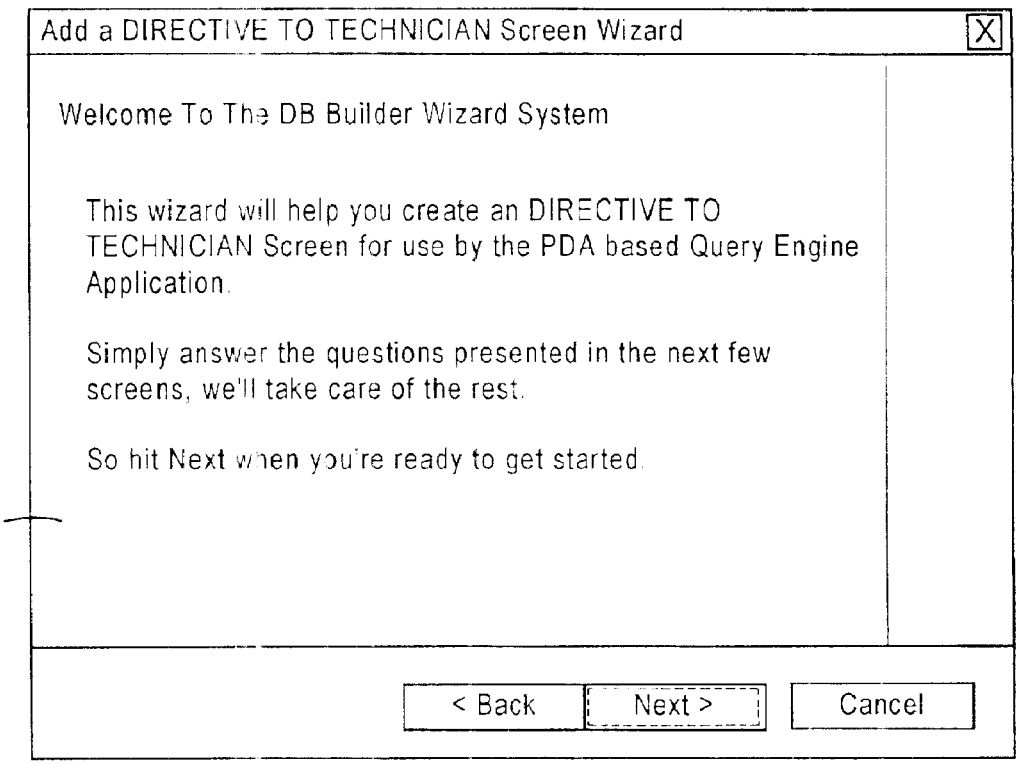
Figure 7B:
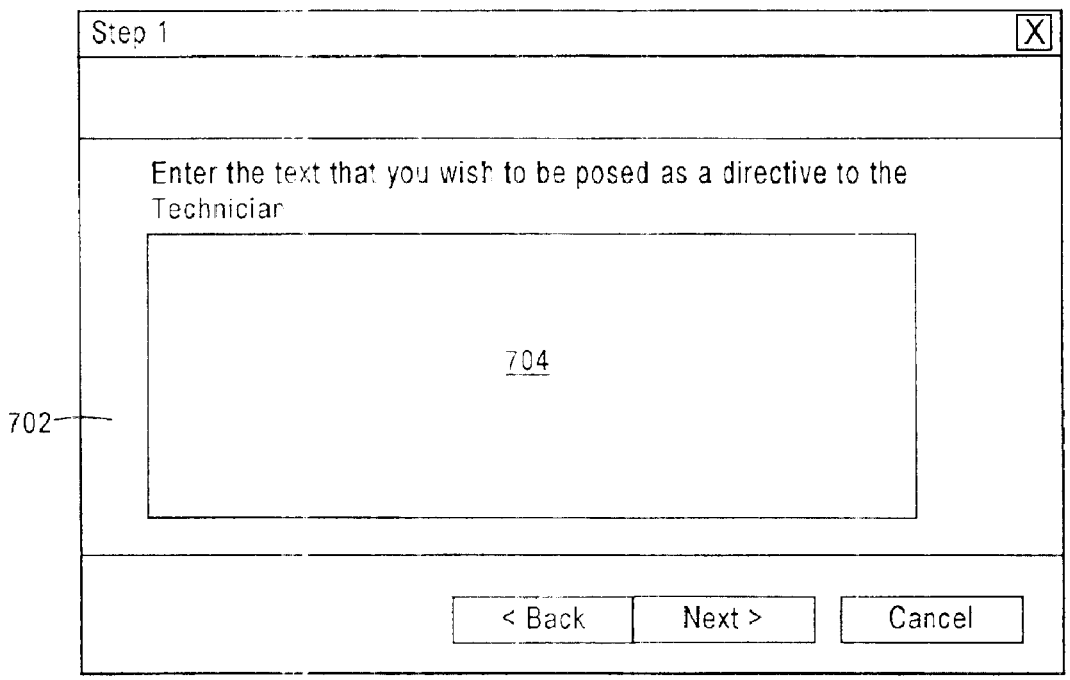
Figure 7C:
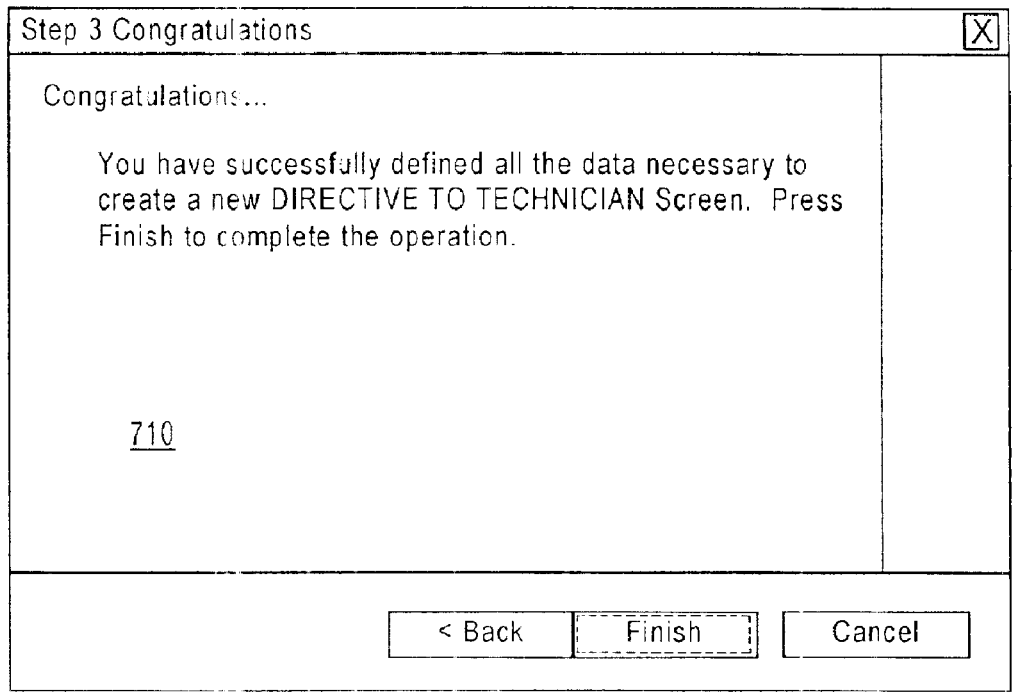

FIGS. 7A–7C show a sequence of screens that an exemplary development wizard tool would provide to help an unskilled user produce a PDA screen built from a Directive template. After screen 700 (see FIG. 7A) is presented to the user to explain the use of this type of template, the user is presented, as shown in FIG. 7B, the screen 702 having a text entry box 704. This text entry box 704 allows the user to input the text that will be displayed to the user. After completion of the text input, the user can select the "Next" button and proceed to the exit screen 710 as shown in FIG. 7C. Upon exiting, the DB Builder constructs a DFD record with the information supplied by the user.

Figure 8A:
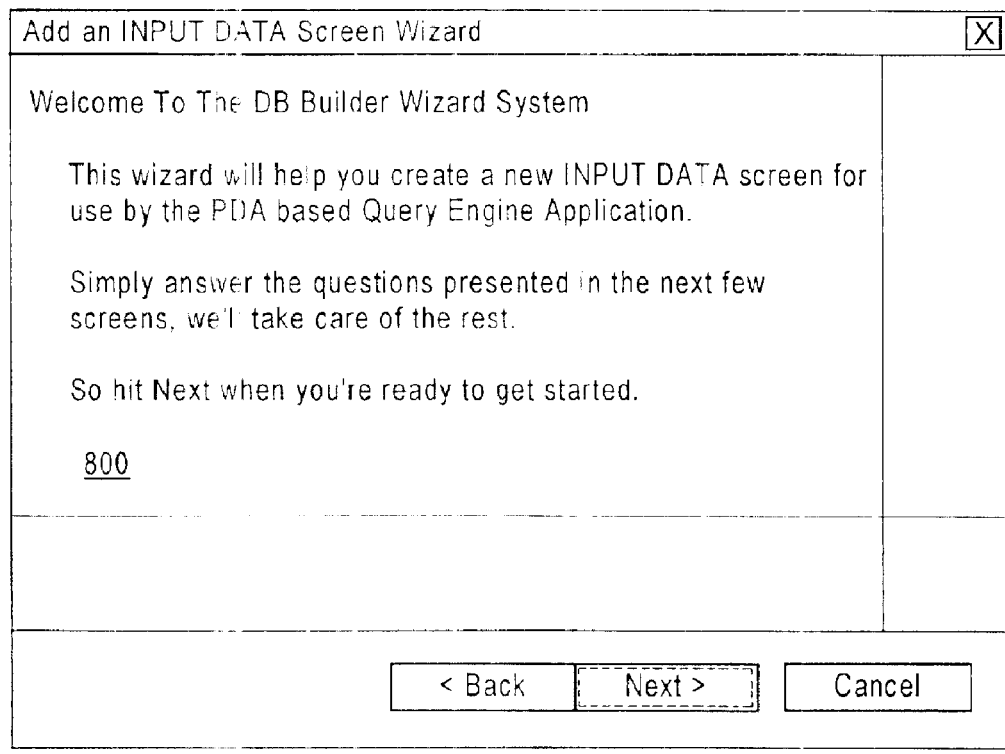
Figure 8B:
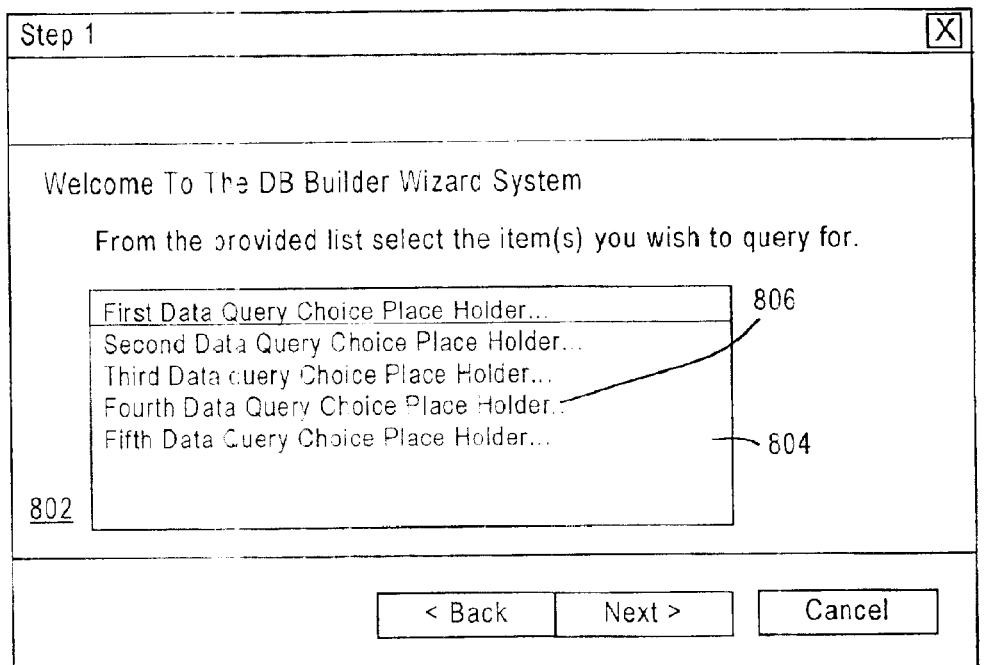
Figure 8C:
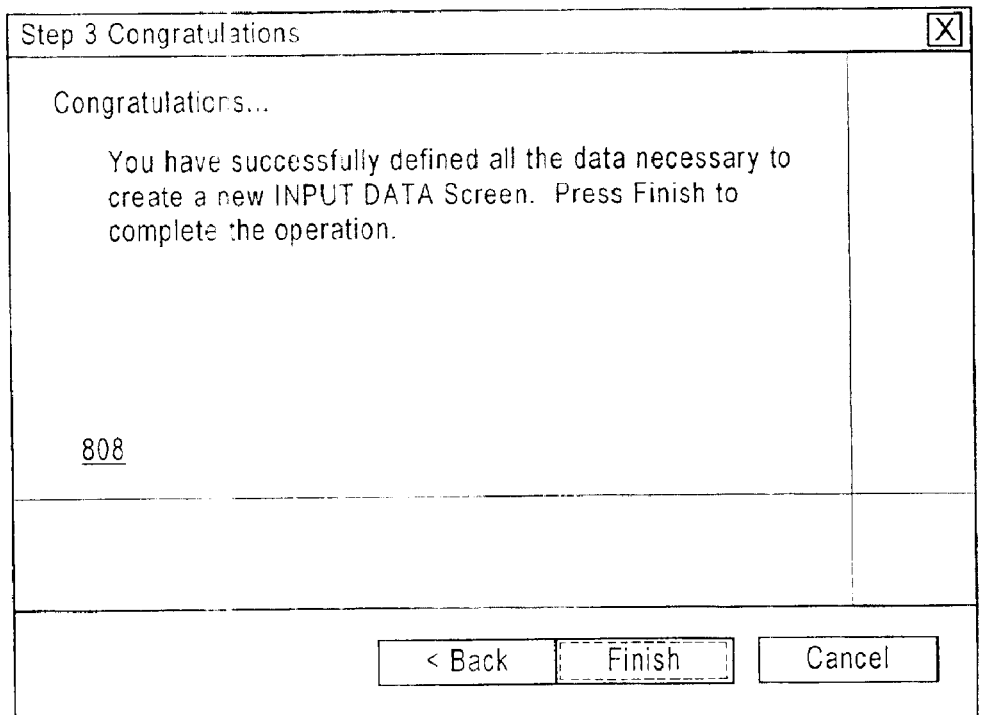

FIGS. 8A–8C show a sequence of screens that an exemplary development wizard tool would provide to help an unskilled user produce a PDA screen built from an Input Data template. The welcome screen 800, as shown in FIG. 8A, explains to the user the function and purpose of the Input Data template. By proceeding to the next screen 802, as shown in FIG. 8B, the user is provided a selection window 804 that lists a number of items 806. The items 806 presented in selection window 804 are retrieved from the QD database that corresponds to the appliance initially selected when starting the DB Builder application. The user selects those items that will be retrieved using the Input Data screen that is being defined. In creating the DFD record for the Input Data screen, The DB Builder application retrieves the command strings associated with the selected query items and embeds them in the DFD record. Upon completion of the screen 802, the user can proceed to the finish screen 808 as shown in FIG. 8C. Upon exiting, the DB Builder constructs a DFD record with the information supplied by the user.

Figure 9A:
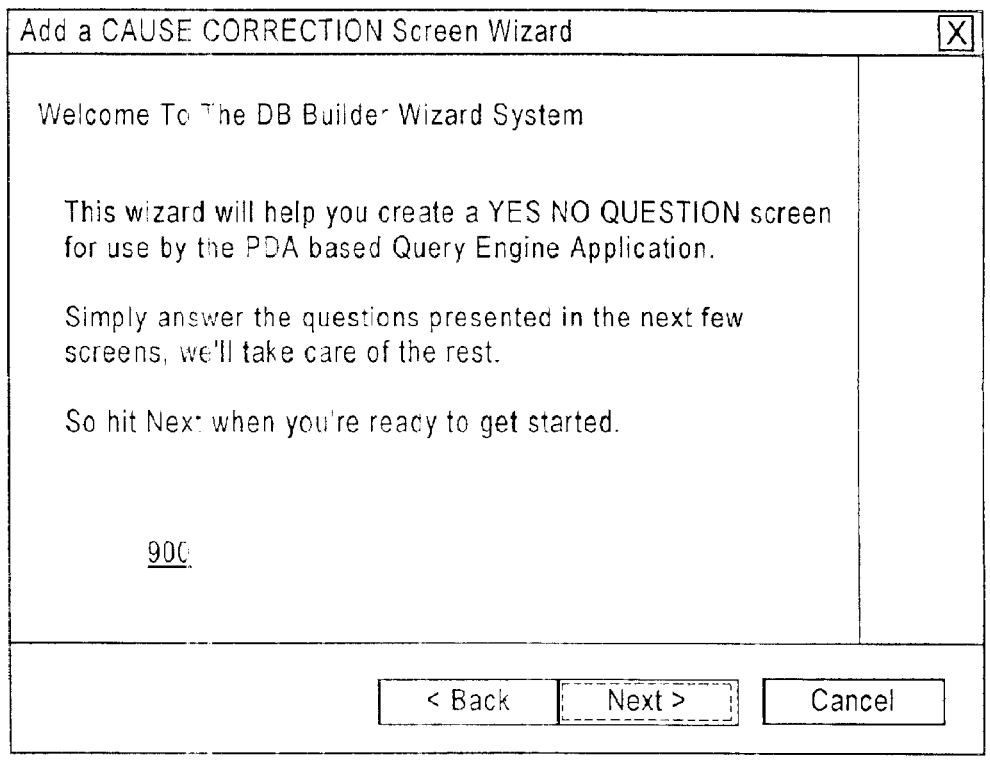
Figure 9B:
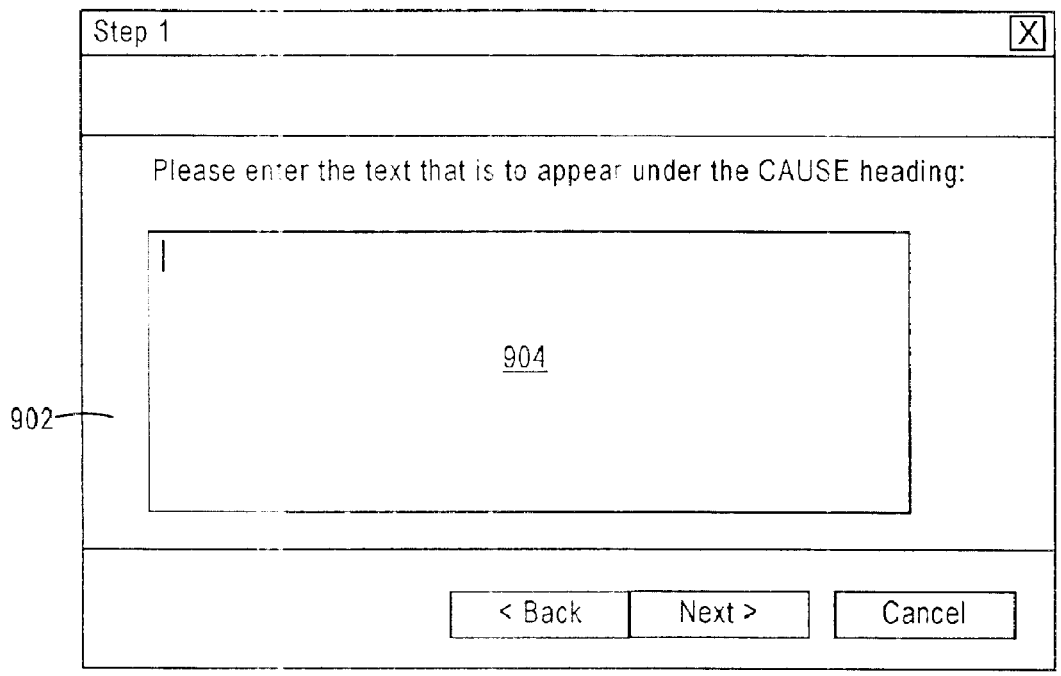

FIGS. 9A–9F show a sequence of screens that an exemplary development wizard tool would provide to help an unskilled user produce a PDA screen built from a Cause/Correction template. The user begins, as shown in FIG. 9A, with the screen 900 that explains the function and purpose of this type of template. The user then proceeds, as shown in FIG. 9B, to a screen 902 having a text entry box 904 that permits inputting the text that is associated with the "Cause". FIG. 9C depicts the next screen 906 the user encounters; this screen 906 has a text entry box 908 that permits inputting the text associated with the "Correction". In a preferred embodiment, as shown in FIG. 9D, the user is then automatically presented with a screen 910 giving the opportunity to define a Yes/No template (typically to determine if the correction was successful). FIG. 9E provides a screen 912 allowing the inputting of the question in a text entry box 914 and a corresponding screen (not shown) allows as described before assigning a sub-node to each Yes/No button. Finally, the user is presented with screen 916, as shown in FIG. 9F, when the screen definition is completed. Upon exiting, the DB Builder constructs a DFD record with the information supplied by the user.

Figure 10:
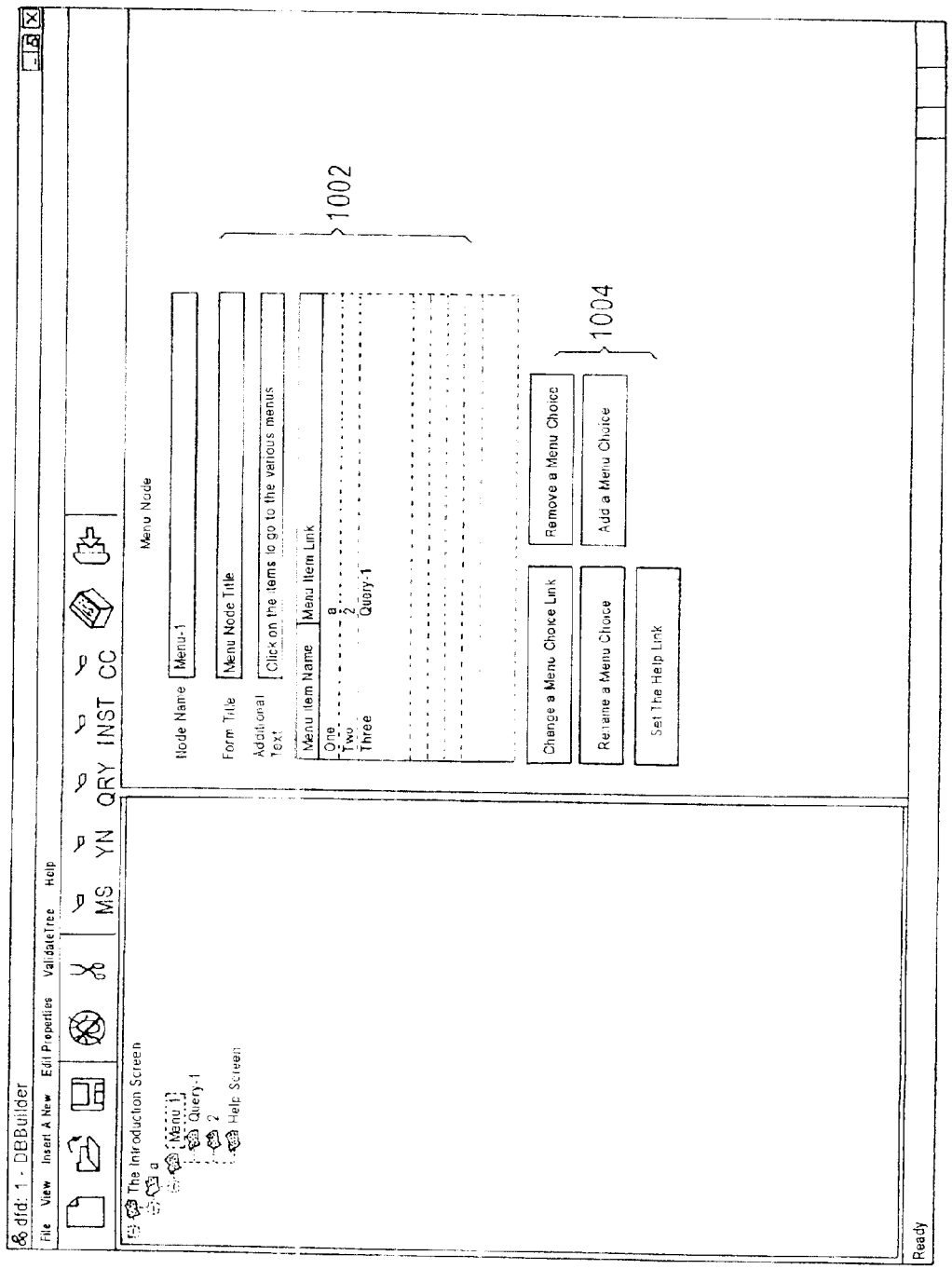

FIG. 10 depicts a screen 1000 that allows a user to edit the attributes of a node. In this screen 1000, the Menu 1 node is selected and its attributes are revealed in region 1002. These attributes can include information associated with the node such as the title, additional text, the menu item labels and the menu item links. A plurality of buttons 1004 are presented to a user that, upon selection, permit, editing, adding or deleting certain ones of these attributes. The editing buttons 1004 are customized for the template type associated with the selected node. For example, in the exemplary screen 1000, the choices are to "Change a Menu Choice Link", "Remove a Menu Choice", "Rename a Menu Choice", "Add a Menu Choice" and "Set the Help Link". If the node selected had been an Input Data Node then other, more appropriate, editing buttons 1004 would have been provided to the user.

Upon completion of the definition of each screen within a diagnostic flow, the DB Builder application creates a DFD file from all the DFD records that were created during the user's session.

Query Engine

Overview

The query engine is an event-driven loop that is responsible for dynamically creating user interface screens (or forms), processing user and appliance input data, querying the appliance device, retrieving data from the various database files that make-up a diagnostic module, and saving data for uploading to a remote computer application.

Figure 11:
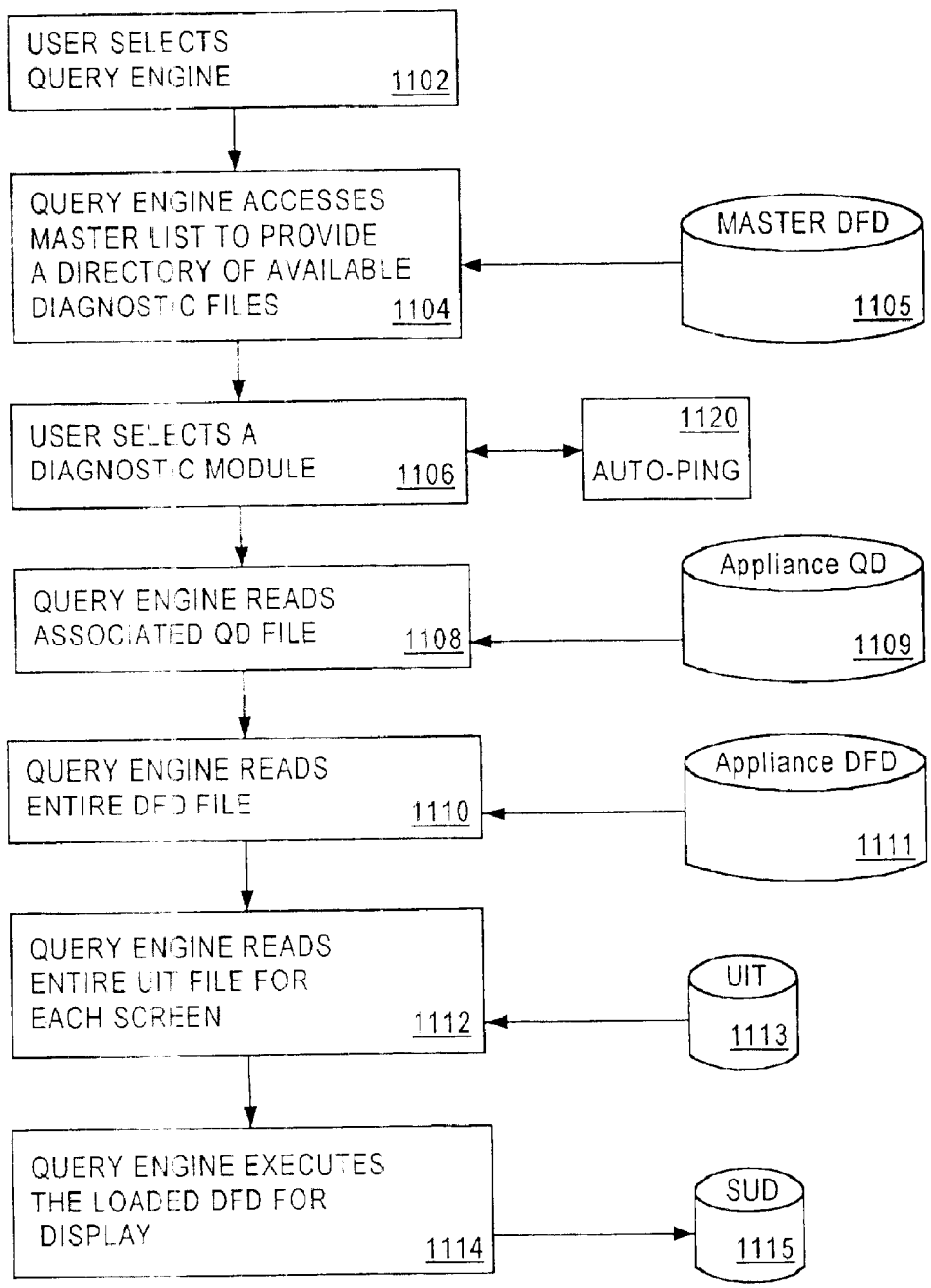
FIG. 11 illustrates a flowchart for an exemplary query engine according to an embodiment of the present invention.

FIG. 11 depicts an overview of the operation of the query engine according to an embodiment of the present invention. In step 1102, the technician selects the query engine by operating the PDA within which the query engine is stored. Upon execution, the query engine, in step 1104, queries a master list 1105 of those DFDs that are currently available on the PDA. The technician, in step 1106 can select one of the modules from the list to start (step 1108) the query engine's reading of the QD files 1109 associated with the selected module. The query engine then, in step 1110, reads the DFD records 1111 associated with the selected module to retrieve the data and other information controlling the diagnostics flow. In order to display a screen to the technician, the query engine also reads, in step 1112, a UIT file 1113 to control how the DFD data is displayed (step 1114). The diagnostic flow continues with subsequent DFD records and associated template used to display screens to the technician, acquire and store data, and control the diagnostics flow path. One alternative to the user manually selecting the diagnostic module in step 1106 is to include a "ping" type command that the query engine can send out over a communications port to discover what device or devices are attached. This functionality depends on the attached devices having the intelligence to recognize the ping command and respond accordingly.

Exemplary Embodiment

Figure 12:
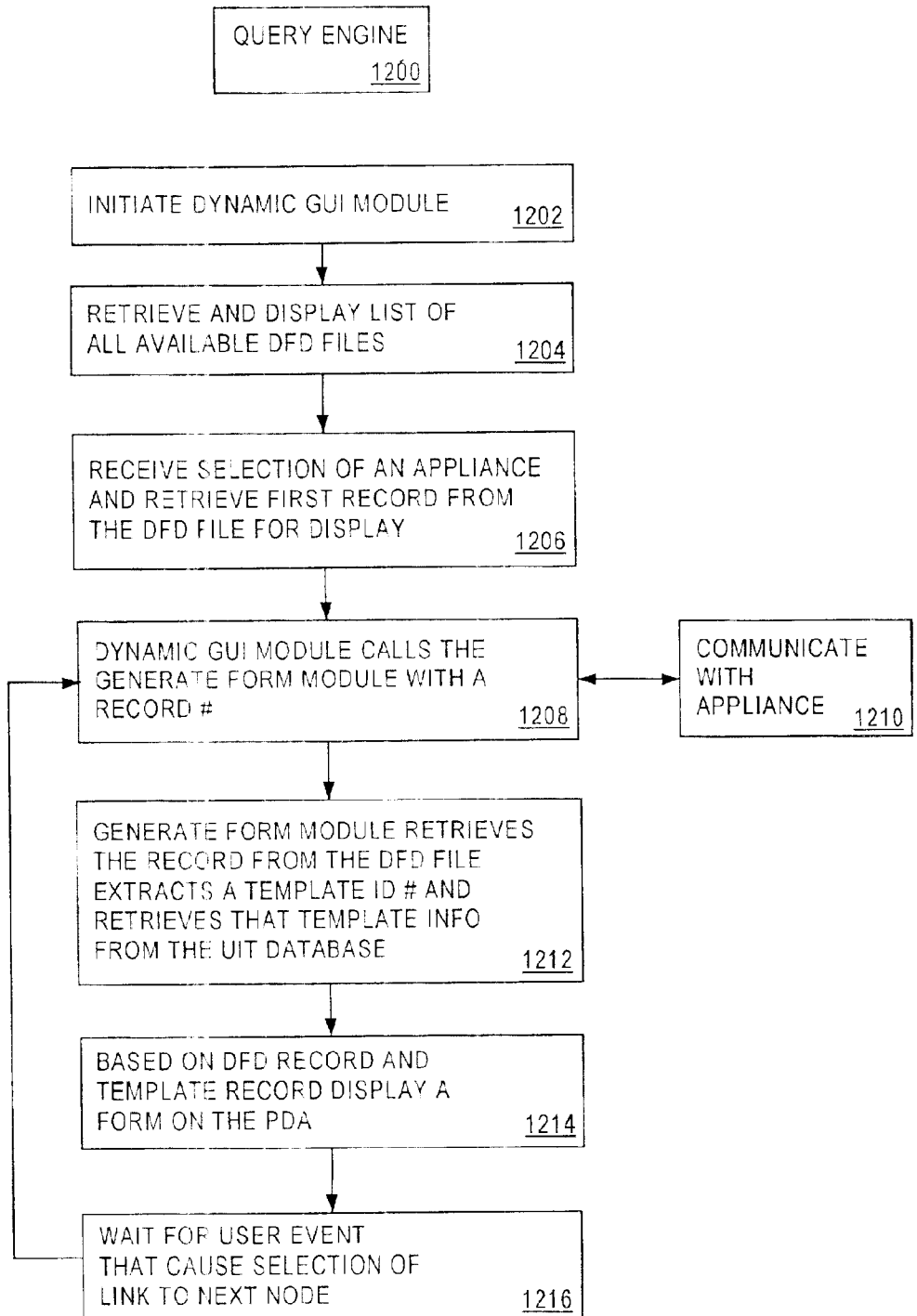
FIG. 12 illustrates a more detailed flowchart for the query engine according to FIG. 11.

The query engine can be implemented using a number of different modules and application programming interfaces, as would be recognized by a skilled computer programmer, that operate and communicate together to perform the functions of the query engine. One exemplary organization of the query engine is described below with reference to FIG. 12. However, it should be recognized that the query engine can be implemented in many other, functionally-equivalent, ways.

When the query engine is first activated (step 1202), a Dynamic GUI module will retrieve (step 1204) a list of all of the active DFD databases that reside on the PDA. From this list, the Dynamic GUI module will create a form that will permit the technician to select a specific appliance device. This module can also include a "clean-up" feature to remove any old or unused DFD files. Once the DFD database is selected, the Dynamic GUI module will retrieve (step 1206) the first record in the DFD database. From this record, the first form or screen associated with the appliance will be displayed on the PDA.

The Dynamic GUI module is capable of displaying information, performing data entry for field inputs, initiating communication with a specific hardware device, and saving data retrieved from the technician or hardware appliance. The Dynamic GUI is capable of branching to sub-nodes or, in other words, generating a new form dynamically according to input from the technician and the DFD database. For querying information from a hardware device, the Dynamic GUI module can call (step 1210) a separate Query Device module to send commands to the specific hardware device.

The Dynamic GUI module can call (step 1208) a Generate Form module to dynamically generate (step 1212) all forms for display on the PDA by specifying to the Generate Form module the record within the DFD file of the needed form. The Generate Form module will search the DFD database for the form, or record, specified. The specified record includes a template ID that identifies the type of template to use for displaying the form and the Generate Form module uses that ID to retrieve template information from the DFD record and the Template record associated with the specified form.

The routine called by the Generate Form module to retrieve template information receives the ID of the template used for the specified form. Information about each template is defined within a respective record of the User Interface Template (UIT) database, this information can include items such as the number of template objects and their respective locations and an indicator if an object can be repeated within a pre-defined screen area. Other information included in a template record can include, for example, the number of buttons, button information and labels, text information including font size, bold or underline information, field input information, and bitmap image information. Information not included in this template database is any information that is specific to the a generated form. For example, the template may specify that text appears at a location (20, 20); however, it is the information within the DFD record that specifies what text will actually be placed at this location. Another example is that a "left-arrow" button at location (90, 100) can be specified by the template; however, the child node associated with a selection of that button is determined from the DFD record.

Using the information from the template record and the DFD record, the Generate Form module displays (step 1214) an appropriate screen to the technician. In a preferred embodiment, in addition to the template, each displayed user interface screen will have a "Main" button and a "Back" button. The main button, when selected, will propel the technician to the first screen of the diagnostics flow and the "Back" button will navigate the user to the previous screen in the diagnostics flow. The diagnostic flow waits (step 1216) for a user event (e.g., input, or button selection) to determine the next screen that the Generate Form module will display.

The query engine can use a Command Generator module to send ASCII strings, or other type strings, to a communications output port for communicating with an appliance device. If a technician selects the "Query" button on a displayed form, then the Command Generator module will be called to generate an appropriate command to query a device using the communications port. Conversely, the query engine will also collect data received from the queried appliance and store it in a flat file. This flat file can be uploaded to a remote workstation for a variety of purposes such as reviewing a technicians work, for statistical data collection regarding a particular device or manufacturer, for archiving maintenance records of a specific appliance, and to document warranty work or procedures.

For example, a user input data form (that is, a form that is built using the user input data template) may contain a number of input fields and push buttons for data entry as well as a "query" button. When the "Query" button is pressed, or selected, data for each field within in the form is received from the external device. As the query engine receives data for each field, a new record containing the transferred data is created in a uniquely named database file. Such a unique name can be created using a date or time stamp, or possibly rely on a device ID stored in the appliance, or by other similar means. This saved user data can later be extracted from the PDA using its hot-sync functionality.

Figure 13:
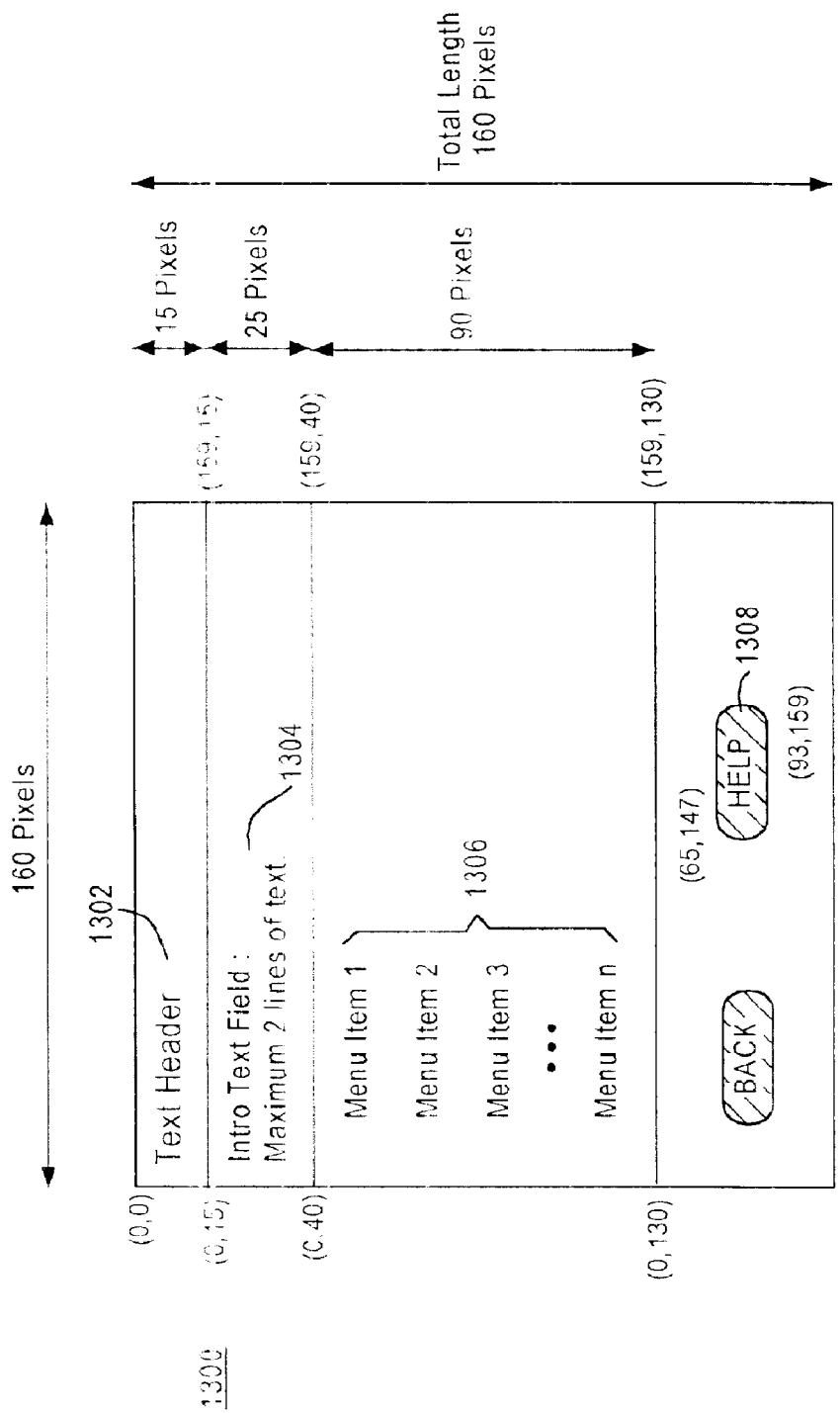
FIG. 13 illustrates a diagram of the coordinate system used within Palm Pilot display screen.

As indicated, each DFD record will reference a UIT record. The UIT record contains information about the number of entities, the sequencing of the entities, and the positioning of the entities that are defined within the DFD record. As an example, the DFD record may specify to use the menu template (e.g., UIT record # 0). As a result, the query engine will expect, in one embodiment, 4 entities which are further defined within the DFD record. In the exemplary menu template of FIG. 13, these entities are "Menu Title (i.e., Text Header)" 1302, "Introductory Text Field" 1304, "List Control for menu selection" 1306, and a "Help" button 1308. This UIT record will also specify the positioning coordinates of each of these entities. A Palm Pilot, for example as shown in FIG. 13, is defined as a 160×160 grid and it is this coordinate system that is used to specify the position of the entities within a template.

Exemplary DFD Record and Template

Figure 14:
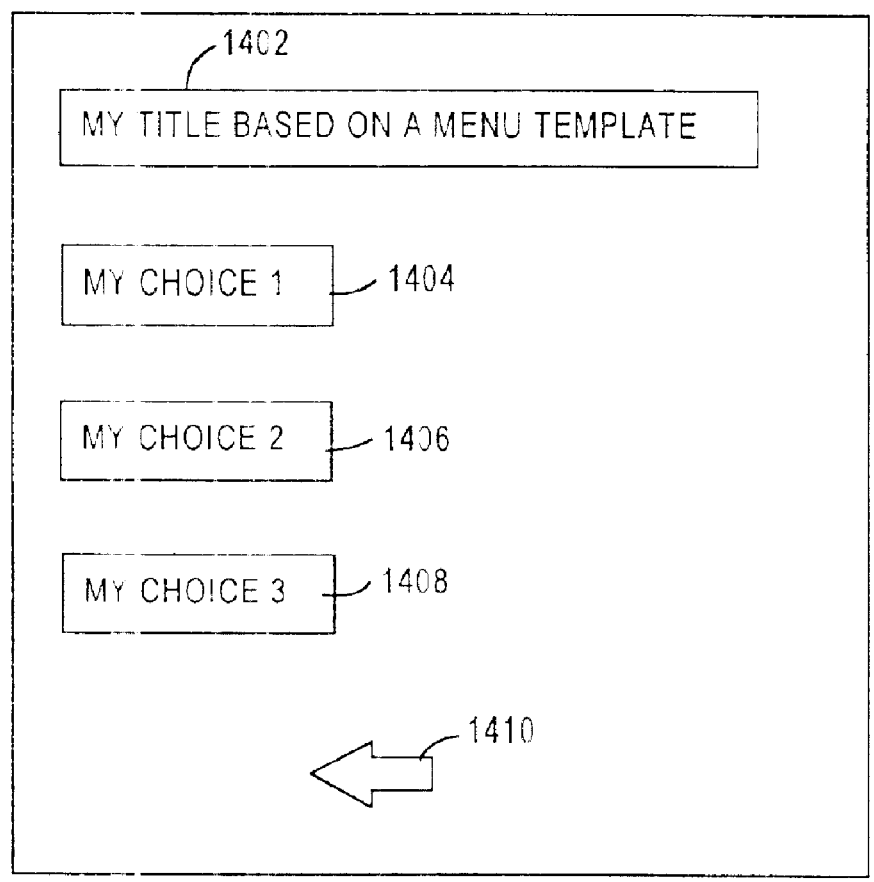
FIG. 14 illustrates an exemplary menu screen according to an embodiment of the present invention.

FIG. 14 depicts an exemplary screen that was built using the menu template. According to that template, the screen has a title 1402, a plurality of choices (each of which result in a link being selected) 1404, 1406 and 1408, and a back button 1410. The first table is an exemplary DFD record for creating the screen of FIG. 14. As seen from the table, the first 12 rows define an exemplary DFD record header that identifies aspects of the record. Next, the title text, the number of buttons and each button's child ID is specified. The second table is an exemplary Menu template that is used in extracting the information from the DFD record and properly displaying it on the screen. Together, these files are utilized by the query engine to create the display shown in FIG. 14 on the technician's PDA.

DFD Record:

| FIELD NAME | TYPE | DESCRIPTION |
|---|---|---|
| Signature | TEXT | "xyzzy" |
| Version | UInt | 0x01000 |
| RecordLen | UInt | 150 |
| UniqueID | UInt | 1 |
| ParentID | UInt | 0 |
| TemplateID | UInt | 0 |
| LongNodeName | TEXT | "TitleMenu" |
| ShortNodeName | TEXT | "TM" |
| HyperLink | UInt | 0 |
| Bitmap_File_Name | TEXT | " " |
| Audio_File_Name | TEXT | " " |
| WebURL | TEXT | " " |

-continued

| FIELD NAME | TYPE | DESCRIPTION |
| --- | --- | --- |
| EntityText | TEXT | "My Title Based on a Menu Template" |
| Text_Justification | eNum | JUSTIFY_CENTER |
| Number_Buttons | UChar | 3 |
| ChildID | UInt | 2 (unique id of record to go to) |
| Entity_Button_Text | TEXT | "My Choice 1" |
| Entity_QD_Output | Word | −1 (indicates no QD command) |
| ChildID | UInt | 3 (unique id or record to go to) |
| Entity_Button_Text | TEXT | "My Choice 2" |
| Entity_QD_Output | UInt | −1 (indicates no QD command) |
| ChildID | UInt | 4 (unique id or record to go) |
| Entity_Button_Text | TEXT | "My Choice 3" |
| Entity_QD_Output | UInt | −1 |

Template Record:

| FIELD NAME | TYPE | DESCRIPTION |
| --- | --- | --- |
| Signature | TEXT | "xyzzy" |
| Version | UInt | 0x01000 |
| RecordLen | UInt | 33 |
| TemplateID | UInt | 0 |
| Num_Template_Entities | UChar | 2 |
| EntityID | UInt | HEADER |
| EntityType | Enum | ENTITY_TEXT |
| EntityX_UL_Loc | UChar | 0, |
| EntityY_UL_Loc | UChar | 0 |
| EntityX_LR_Loc | UChar | 160 |
| EntityY_LR_Loc | UChar | 30 |
| Text_Justification | Enum | TEXT_JUSTIFY_LEFT |
| EntityID | UInt | BUTTON_ARROW |
| EntityType | Enum | Entity_Button |
| EntityX_UL_Loc | UChar | 20 |
| EntityY_UL_Loc | UChar | 30 |
| EntityX_LR_Loc | UChar | 150 |
| EntityY_LR_Loc | UChar | 120 |
| Repeat_Indicator | UChar | 1 |

PDA Screens

FIGS. 15A–15D depict a sequence of exemplary PDA screens created using an embodiment of the present invention. Within this sequence, the query engine is running on the PDA and displaying one screen at a time based on DFD record and UIT records within a diagnostic module. As a technician's activities and inputs require another screen to be displayed, another DFD record and accompanying UIT record are referenced to control the display screen.

Figure 15A:
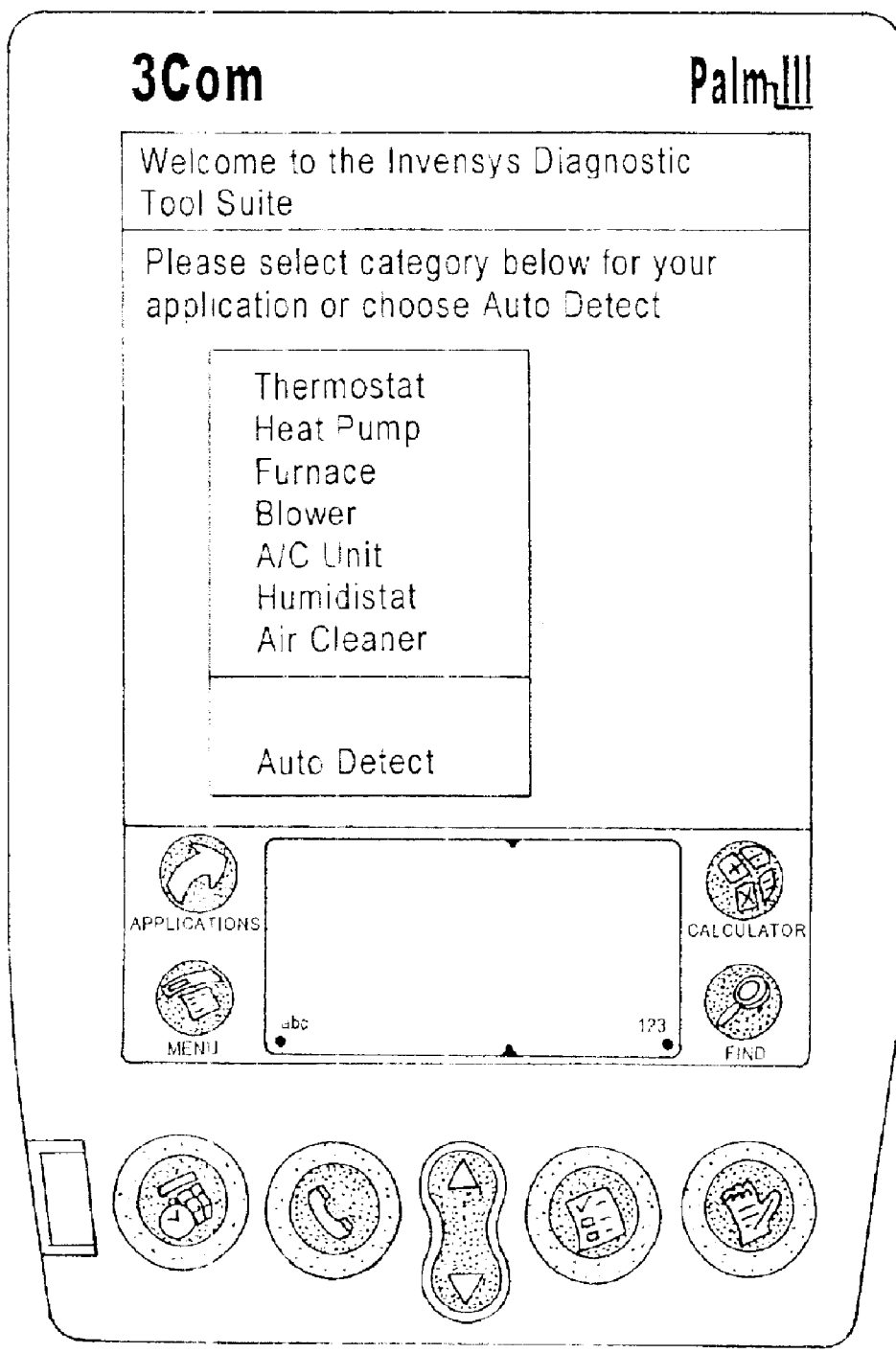
FIGS. 15A–15D illustrate a sequence of exemplary PDA screen shots that display diagnostic records from a diagnostics thread in accordance with an embodiment of the present invention.
Figure 15B:
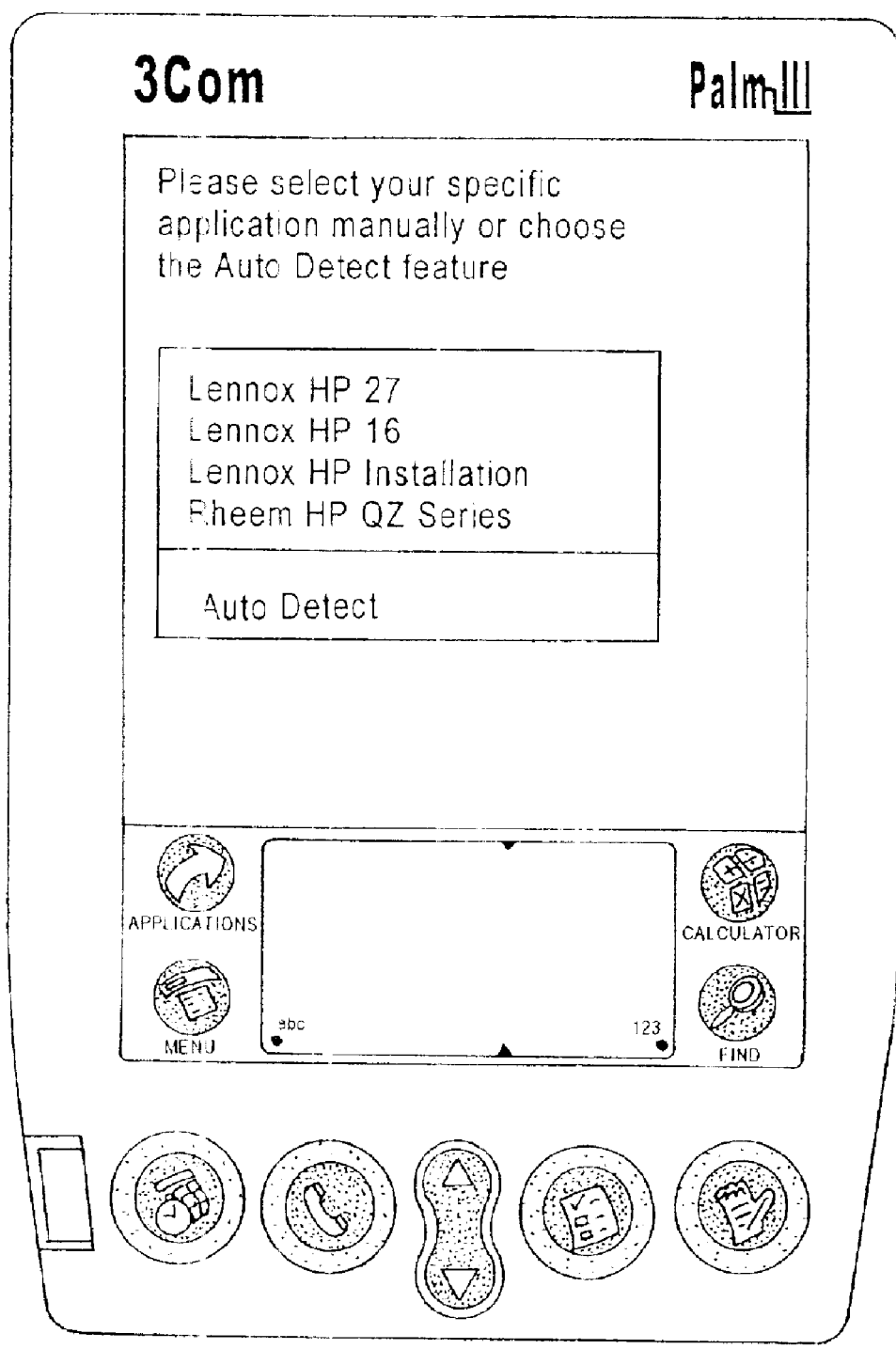
Figure 15C:
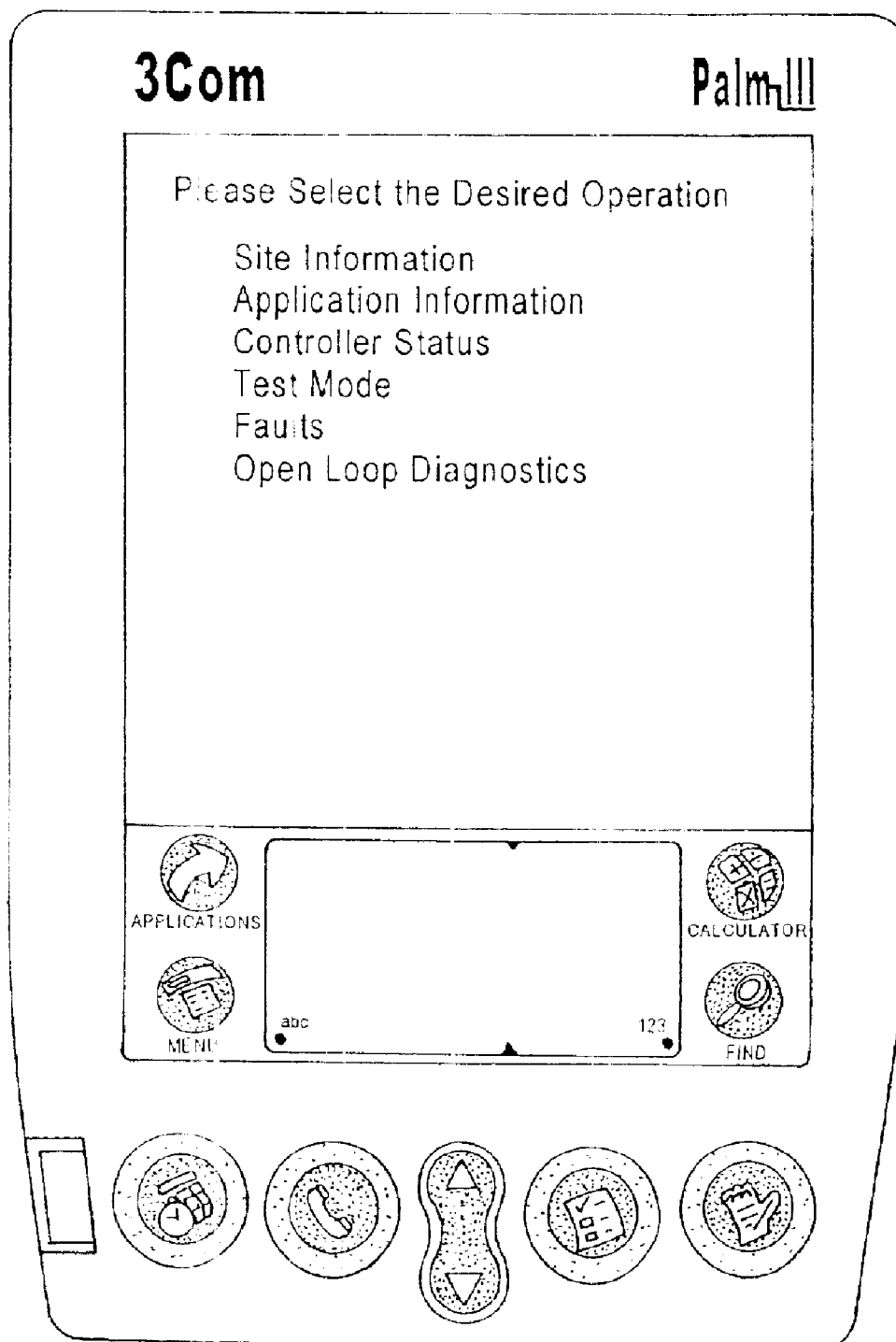
Figure 15D:
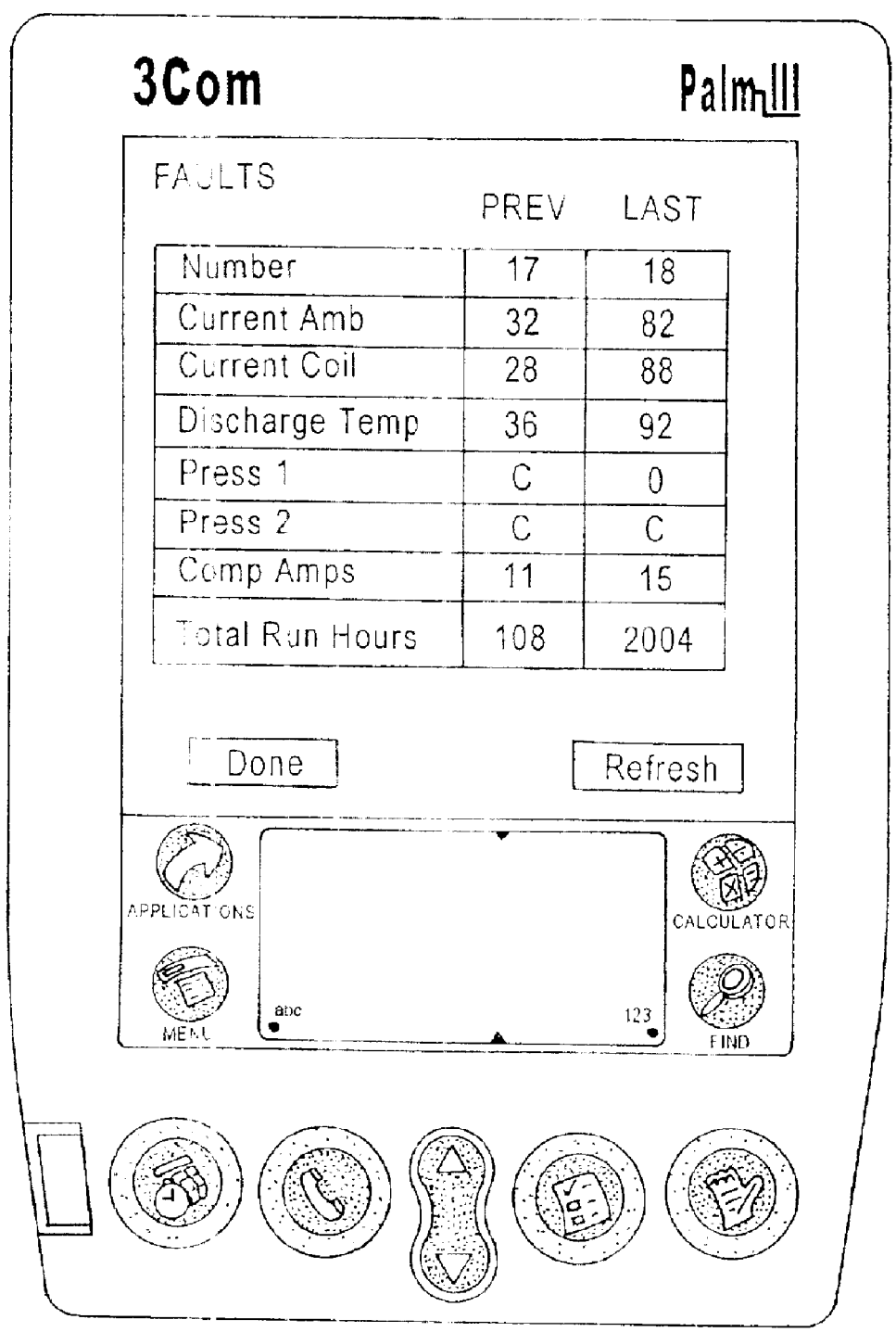

In FIG. 15A, the welcome screen of the diagnostic tool suite is shown as a menu that allows a technician to select a category of equipment to service. The query engine is running on top of the Palm OS to provide this menu. If the technician selects "Heat Pump", then the query engine displays all the diagnostic modules currently in memory that correspond to a heat pump. In particular, FIG. 15B shows that 4 heat pump related diagnostic modules are found. These modules result in a menu of appliance name being present to the technician for selection. The technician also has the option of autodetecting devices out there. Only those items detected and having an available diagnostic module will be presented to the technician for selection. If the technician, for example, selected the Lennox HP27, they screen of FIG. 15C would be presented to the technician to provide a number of selectable options related to this appliance. FIG. 15D depicts the resulting screen if the technician selects "Faults" from the menu of choice in FIG. 15C. The Fault parameters are retrieved by the query engine from the appliance. To perform this function, the query engine must refer to the appropriate QD database to determine which parameters can be queried from an HP27 series appliance and what specific command strings sent to the appliance will result in the retrieval of the correct data values. Once this transfer of data is completed, however, the screen of FIG. 15D can be displayed.

A diagnostic tool suite has been described which is made available to technicians servicing equipment at residential and business locations using a portable device such as a PDA. The PDA runs a main engine that can execute diagnostic modules, with each diagnostic module corresponding to a particular appliance or device that requires troubleshooting, repair, diagnosis, maintenance or installation. The diagnostic modules use a limited number of templates to define possible screen layouts for each screen displayed to the technician. Additionally, the diagnostic module includes a diagnostic flow definition file wherein each record corresponds to a screen displayed to a technician. The main engine uses the template information and the diagnostic flow definition records to fully define a screen to display to a technician. In this way, an extensible, modular, non-specific diagnostic tool suite is available to a technician. To simplify creation of the diagnostic definition files, a graphical user development tool is provided that allows a non-skilled user to select a template definition, to be prompted for definitions of the fields in that template and to create the diagnostic definition file incorporating the user's input.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A data-driven diagnostic apparatus for a plurality of devices, comprising:
   a first file including a plurality of template records, each template record corresponding to a respective one of a plurality of predetermined templates;
   a second file including a plurality of data records, each data record referencing one of the plurality of templates and said second file related to diagnostic information for one of the plurality of devices;
   a display device; and
   a query engine configured to display one of the data records, formatted according to its referenced template, on the display device.

2. The apparatus of claim 1, wherein the query engine is further configured to:
   read the one data record;
   read the referenced template; and
   dynamically format the one data record for display on the display device in accordance with the referenced template.

3. The apparatus of claim 1, wherein the plurality of data records describe one of:
   a diagnostic flow definition, a technical manual,
a troubleshooting method, and
a instructional tutorial.

4. The apparatus of claim 1, wherein the one data record includes one or more links to other ones of the plurality of data records.

5. The apparatus of claim 4, wherein the query engine, in response to an input signal, is further configured to display on the display device a second data record, from among the other ones of the plurality of data records, in accordance with the template referenced by the second data record.

6. The apparatus of claim 1, further comprising a plurality of second files, each second file associated with one of the plurality of devices.

7. The apparatus of claim 6, wherein the query engine is configured to display on the device a list of the plurality of second files.

8. The apparatus of claim 6, wherein each of the plurality of second files also reference the templates referenced by the first file.

9. The apparatus of claim 1, wherein the diagnostic apparatus is a portable computing platform.

10. The apparatus of claim 1, wherein the diagnostic apparatus is a Personal Digital Assistant.

11. The apparatus of claim 1, wherein the diagnostic apparatus is located remotely from the plurality of devices.

12. The apparatus of claim 1, further comprising:
a communications port configured to connect with the one device.

13. The apparatus of claim 12, wherein the one data record includes a command to retrieve information from the one device, and wherein the query engine is further configured to:
receive a input signal,
send the command via the communications port to the device, and
receive from the device information regarding operating parameters.

14. The apparatus of claim 1, wherein the plurality of predetermined templates include a menu template, a yes/no template, a directive template, a cause/corrective template, and a data input template.

15. The apparatus of claim 1,
wherein each template record identifies one or more entities and respective locations to be displayed as a screen on the display device, and
wherein each data record identifies configurable attributes of the one or more entities identified in its referenced template.

16. A method of providing a data-driven diagnostics tool for a plurality of appliances, comprising the steps of:
reading one template record from a template file comprised of a plurality of template records;
reading one record from a data record file, said record referencing the one template record and said data record file is associated with one of the plurality of appliances;
executing a form-generation routine to dynamically format the one record in accordance with the one template record; and
displaying the formatted one record.

17. The method of claim 16, further comprising the steps of:
receiving input in response to displaying the formatted one record;
determining a second record from the data record file based on the input, said second record file referencing a second template record;
executing the form-generation routine to dynamically format the second record in accordance with the second template record; and
displaying the formatted second record.

18. The method of claim 17, further comprising the steps of:
querying the one appliance for operating parameters;
receiving the operating parameters from the one appliance; and
displaying the received operating parameters.

19. The method of claim 16, further comprising the step of:
downloading another data record file associated with a second of the appliances.

20. The method of claim 16, further comprising the steps of:
detecting one or more of the appliances that are available to communicate with;
displaying a list of detected appliances;
receiving input in response to the displayed list; and
determining the data record file to read based on the received input.

21. A diagnostic database development system comprising:
a plurality of template records, each template record corresponding to a respective one of a plurality of predetermined templates and identifying one or more entities and their respective locations on a display screen;
respective device description files, each such file corresponding to an appliance from among one or more appliance;
a graphical user interface tool for each of the template records, each said tool comprising a sequence of screens to gather information for customizing those entities that are configurable in order to create a record; and
a database builder configured to combine any record created by each of the graphical user interface tools into a database file.

22. The system of claim 21, further comprising:
a communications application configured to transfer the database file to a remote device.

23. The system of claim 22, wherein the communications application is further configured to transfer the template records and a device description file corresponding to an appliance related to the database file.

24. The system of claim 22, further comprising:
a file translator configured to convert the database file to a device file compatible with an operating system of the remote device.

25. The system of claim 24, wherein the device file is a flat file.

26. The system of claim 21, wherein the predetermined templates include a menu template, a yes/no template, a directive template, a cause/corrective template, and a data input template.

27. The system of claim 21, wherein a device description file includes command strings for querying its corresponding appliance, and the database builder embeds the command strings in one or more records of the database file.

28. A method for developing a diagnostic flow definition database comprising the steps of:
selecting an appliance that corresponds to the diagnostic flow definition database, the database comprising a plurality of nodes;

for each of the nodes creating a respective record:
selecting a respective template, and
customizing variables and data that are configurable for the respective template; and
combining the records to form the diagnostic flow definition database.

29. The method of claim 28, further comprising the step of:
storing the database locally and transferring the database to a remote device.

30. The method of claim 29, further comprising the step of:
before transferring the database to a remote device, translating the database to a file format compatible with an operating system of the remote device.

31. The method of claim 28, wherein the steps of selecting and customizing are performed via a graphical user interface development tool.

32. The method of claim 28, wherein the configurable variables and data for a respective template include a link to jump to a subsequent node of the diagnostic flow definition database.

33. A method of providing a dynamically generated diagnostic flow for an appliance, comprising the steps of:
executing a query engine to display a sequence of screens on a portable device, wherein said executing step includes the steps of:
a) reading a data record from among a plurality of data records, each data record including information related to one of the sequence of screens and referencing a template;
b) reading the referenced template from among a plurality of template records;
c) displaying the information from the read data record according to a format specified by the referenced template; and
d) repeating steps a)–c) by selecting a next data record in the sequence based on the information from the read record.

* * * * *